(12) United States Patent
Ibaraki

(10) Patent No.: US 9,678,384 B2
(45) Date of Patent: Jun. 13, 2017

(54) RETARDATION FILM, COMPOSITION, METHOD OF MANUFACTURING RETARDATION FILM, POLARIZING PLATE AND LIQUID CRYSTAL DISPLAY DEVICE

(71) Applicant: FUJIFILM Corporation, Tokyo (JP)

(72) Inventor: Jyunko Ibaraki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/886,740

(22) Filed: Oct. 19, 2015

(65) Prior Publication Data

US 2016/0109757 A1   Apr. 21, 2016

(30) Foreign Application Priority Data

Oct. 20, 2014  (JP) ................................. 2014-213749
Oct. 21, 2014  (JP) ................................. 2014-214404

(51) Int. Cl.
| | | |
|---|---|---|
| *C09K 19/00* | (2006.01) | |
| *G02F 1/13363* | (2006.01) | |
| *G02B 5/30* | (2006.01) | |
| *C09K 19/34* | (2006.01) | |
| *C09K 19/56* | (2006.01) | |
| *C09D 4/00* | (2006.01) | |
| *C09K 19/04* | (2006.01) | |
| *C09K 19/20* | (2006.01) | |
| *C09K 19/32* | (2006.01) | |

(52) U.S. Cl.
CPC ......... *G02F 1/133634* (2013.01); *C09D 4/00* (2013.01); *C09K 19/3486* (2013.01); *C09K 19/56* (2013.01); *G02B 5/305* (2013.01); *G02B 5/3016* (2013.01); *G02B 5/3083* (2013.01); *C09K 2019/0448* (2013.01); *C09K 2019/2078* (2013.01); *C09K 2019/328* (2013.01); *C09K 2219/03* (2013.01); *Y10T 428/10* (2015.01); *Y10T 428/105* (2015.01); *Y10T 428/1036* (2015.01)

(58) Field of Classification Search
CPC ........... G02F 1/13363; G02F 1/133633; G02F 1/133634; C09K 19/2007; C09K 19/24; C09K 2019/0448; C09D 4/06; G02B 5/3016; G02B 5/3083; G02B 5/305; G02B 5/32; Y10T 428/10; Y10T 428/1036; Y10T 428/105

USPC ........... 428/1.1, 1.3, 1.33; 349/75, 117, 194; 359/489.07, 489.03, 489.02; 522/39; 524/533; 427/162, 553

See application file for complete search history.

(56) References Cited

U.S. PATENT DOCUMENTS

| | | |
|---|---|---|
| 6,771,340 B1 | 8/2004 | Yoshimi et al. |
| 6,791,645 B2 | 9/2004 | Yano et al. |
| 2002/0039159 A1 | 4/2002 | Yano et al. |
| 2003/0178609 A1* | 9/2003 | Hammond-Smith ... G02B 5/3016 252/587 |

FOREIGN PATENT DOCUMENTS

| | | |
|---|---|---|
| JP | 2001-042127 A | 2/2001 |
| JP | 2002-107541 A | 4/2002 |
| JP | 2011-237513 A | 11/2011 |

* cited by examiner

*Primary Examiner* — Ruiyun Zhang
(74) *Attorney, Agent, or Firm* — Edwards Neils LLC; Jean C. Edwards, Esq.

(57) ABSTRACT

An object of the present invention is to provide a film capable of giving a necessary retardation without degrading the contrast. The present invention provides a retardation film formed from a composition which includes a polymer compound, a rod-like liquid crystal compound and a photo-reactive compound, wherein the polymer compound has a side chain which has one or more azo groups and/or cynnamate groups, and 3 or more and 10 or less arylene groups; the side chain further has an optionally substituted amino group, or a hydrocarbon group at the terminal; an absolute value of difference between an SP value of the polymer compound and an SP value of the photo-reactive compound is 1.1 or less; and an in-plane retardation of the film at wavelength of 550 nm is 10 nm or more and 200 nm or less.

14 Claims, No Drawings

RETARDATION FILM, COMPOSITION, METHOD OF MANUFACTURING RETARDATION FILM, POLARIZING PLATE AND LIQUID CRYSTAL DISPLAY DEVICE

CROSS-REFERENCE TO RELATED APPLICATIONS

The present application claims priorities under 35 U.S.C. §119 to Japanese Patent Application No. 2014-213749 filed Oct. 20, 2014 and Japanese Patent Application No. 2014-214404 filed Oct. 21, 2014. The above applications are hereby expressly incorporated by reference, in their entirety, into the present application.

TECHNICAL FIELD

This invention relates to a retardation film, a composition, a method of manufacturing a retardation film, a polarizing plate and a liquid crystal display device.

BACKGROUND ART

Liquid crystal display device, recognized as a low-power-consumption, space-saving image display device, has been expanding its applications year by year. As the market expands, not only within television or the like where high-definition image is required, but also into mobile devices including mobile phone and tablet personal computer, there has been an increasing need for thinning. The liquid crystal display device is configured by a liquid crystal cell, and polarizing plates disposed on both sides thereof. In many cases, the polarizing plate is optically compensated while laminated with a retardation film.

Patent Document 1 describes an optical sheet which includes a retardation film having an Nz value exceeding 0.4 and less than 0.6, and (nx−ny)d of 200 to 350 nm, and a transparent layer formed on one surface thereof, having a thickness of 10 μm or less, and a refractive index anisotropy given by nx≈ny>nz, where nz is refractive index observed in the thicknesswise direction defined as the Z axis, nx is refractive index observed in one direction in a plane normal to the Z axis, ny is refractive index observed in the direction normal to the Z axis and the X axis, the X axis is laid in the direction in plane along which the refractive index appears maximum, Nz=(nx−nz)/(nx−ny) holds, and d is the film thickness.

Patent Document 2 describes a composite retardation plate configured by using one or two or more sheets of a retardation film having at least one of nx, ny and nz being different from the other, where nx and ny being in-plane principal refractive indices, nz being refractive index in the thicknesswise direction, nx≥ny holds; and one or two or more sheets of liquid crystal phase sheet which is composed of a transparent base having different values of nx, ny and nz, and a liquid crystal polymer layer provided thereto; wherein the sheets are combined so that the retardation film, the transparent base and the liquid crystal polymer layer will have different wavelength dependence of birefringence, the retardation film and the transparent base will have different values of Nz which is defined by (nx−nz)/(nx−ny); and each of the retardation film and the transparent base is composed of a film having a non-liquid crystalline polymer aligned therein.

Patent Document 3 describes a light absorption anisotropic film containing at least one species of thermotropic liquid crystalline dichroic dye, and at least one species of thermotropic liquid crystalline polymer, wherein the mass content of the thermotropic liquid crystalline dichroic dye in the light absorption anisotropic film is 30% or more.

CITATION LIST

Patent Literature

[Patent Document 1] JP-A-2002-107541
[Patent Document 2] JP-A-2001-042127
[Patent Document 3] JP-A-2011-237513

SUMMARY OF THE INVENTION

It would be advantageous if a necessary retardation can be achieved simply by a liquid crystal layer having a large birefringence, so as to meet the above-described need for the thinning of liquid crystal display device. Nematic liquid crystal layer has, however, been suffering from degradation in contrast. This invention was conceived in view of the situation described above, and is to provide a film capable of giving a necessary retardation without degrading the contrast. This invention is also to provide a retardation film capable of satisfying desired optical characteristics. This invention is also to provide a composition used for manufacturing the retardation film, a method of manufacturing a retardation film, a polarizing plate and a liquid crystal display device.

After intensive studies aimed at solving the problems, the present inventors found that a retardation film, whose problems have been solved, may be manufactured by using a polymer compound having a side chain with certain structure, a rod-like liquid crystal compound and certain photo-reactive compound. After further intensive studies aimed at solving the problems, the present inventors also found that a retardation film, whose problems have been solved, may be manufactured by using a polymer compound having a side chain with certain structure, and an alignment controlling agent. This invention was completed based on these findings. According to this invention, aspects of the invention below will be provided.

(1) A retardation film formed from a composition which comprises a polymer compound, a rod-like liquid crystal compound and a photo-reactive compound, wherein the polymer compound has a side chain which has one or more azo groups and/or cynnamate groups, and 3 or more and 10 or less arylene groups; the side chain further has an optionally substituted amino group, or a hydrocarbon group at the terminal; an absolute value of difference between an SP value of the polymer compound and an SP value of the photo-reactive compound is 1.1 or less; and an in-plane retardation of the film at wavelength of 550 nm is 10 nm or more and 200 nm or less.

(2) The retardation film of (1), wherein the polymer compound is represented by Formula IX:

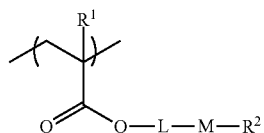

Formula IX in the formula, $R^1$ represents a hydrogen atom or methyl group, L represents a single bond, —$(CH_2)_xO$— or —$(CH_2CH_2O)_y$—, x is an integer of 2 to 10, y is an integer of 1 to 5, $R^2$ represents an optionally substituted amino group or hydrocarbon group, and M represents a structure represented by Formula X below:

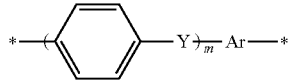

Formula X in the formula, each * represents a bonding site with L or $R^2$; Y represents an azo group, —OCO—, —CO(=O)—, —OCO—CH=CH— or —CH=CH—$CO_2$—, m represents an integer of 2 to 9, the plurality of (Y)s may be same or different; and Ar represents an optionally substituted arylene group.

(3) The retardation film of (1), wherein a content of the rod-like liquid crystal compound, relative to 100 parts by mass of the polymer compound, is 0.1 to 40 parts by mass.

(4) The retardation film of (1), wherein a content of the photo-reactive compound, relative to 100 parts by mass of the polymer compound, is 0.1 to 40 parts by mass.

(5) The retardation film of (1), which is a single layered film.

(6) The retardation film of (1), which has an Nz of 0.3 to 0.9, where Nz=(nx−nz)/(nx−ny), nx represents refractive index in in-plane slow axis direction, ny represents refractive index in the in-plane direction normal to nx, and nz represents refractive index in the direction normal to nx and ny.

(7) The retardation film of (1), which has a thickness of 5 μm or less.

(8) A composition comprising a polymer compound, a rod-like liquid crystal compound and a photo-reactive compound, wherein the polymer compound has a side chain which has one or more azo groups and/or cynnamate groups, and 3 or more and 10 or less arylene groups; the side chain further has an optionally substituted amino group, or a hydrocarbon group at the terminal; and an absolute value of difference between an SP value of the polymer compound and an SP value of the photo-reactive compound is 1.1 or less.

(9) A method of manufacturing a retardation film of (1), which comprises coating the composition of (8) on a substrate.

(10) The method of manufacturing a retardation film according to (9), which further comprises heating the composition, having been coated on the substrate, at 40° C. or above, and photo-irradiating the composition after heating at a dose of 300 to 30000 mJ/$cm^2$.

(11) A polarizing plate comprising a polarizer, and the retardation film of (1).

(12) A liquid crystal display device comprising the retardation film of (1).

(13) The liquid crystal display device of (12), which is an IPS liquid crystal display device.

(14) A retardation film comprising a polymer compound and an alignment controlling agent, wherein the polymer compound has a side chain which has one or more azo groups and/or cynnamate groups and 3 or more and 10 or less of arylene group, the side chain further has an optionally substituted amino group, or a hydrocarbon group at the terminal, a content of the polymer compound in the retardation film is 71% by mass or more, and an in-plane retardation of the film at wavelength of 550 nm is 10 nm or more and 200 nm or less.

(15) The retardation film of (14), wherein the polymer compound is a compound represented by Formula IX:

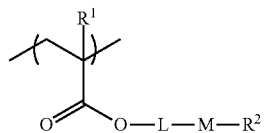

Formula IX in the formula, $R^1$ represents a hydrogen atom or methyl group, L represents a single bond, —$(CH_2)_xO$— or —$(CH_2CH_2O)_y$—, x is an integer of 2 to 10, y is an integer of 1 to 5, $R^2$ represents an optionally substituted amino group or hydrocarbon group, and M represents a structure represented by Formula X below:

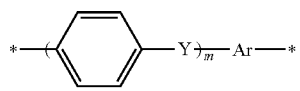

Formula X in the formula, each * represents a bonding site with L or $R^2$; Y represents an azo group, —OCO—, —CO(=O)—, —OCO—CH=CH— or —CH=CH—$CO_2$—, m represents an integer of 2 to 9, the plurality of (Y)s may be same or different; and Ar represents an optionally substituted arylene group.

(16) The retardation film of (14), wherein the alignment controlling agent is a compound represented by Formula I below:

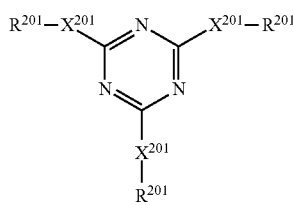

Formula I in the formula, each $R^{201}$ independently represents an aromatic hydrocarbon ring or heterocycle having substituent(s) at least on any of the ortho, meta and para positions, each $X^{201}$ independently represents a single bond or —$NR^{202}$—, each $R^{202}$ independently represents a hydrogen atom, or alkyl group, alkenyl group, aromatic hydrocarbon cyclic group or heterocyclic group, which may be substituted or unsubstituted.

(17) The retardation film of (14), wherein a content of the alignment controlling agent, relative to 100 parts by mass of the polymer compound, is 0.1 to 20 parts by mass.

(18) The retardation film of (14), which is a single layered film.

(19) The retardation film of (14), which has an Nz value of −0.29 to 0.29;

where, Nz=(nx−nz)/(nx−ny), nx represents refractive index in in-plane slow axis direction, ny represents refractive index in an in-plane direction normal to nx, and nz represents refractive index normal to nx and ny.

(20) The retardation film of (14), which has a thickness of 5 μm or less.

(21) A composition comprising a polymer compound and an alignment controlling agent, wherein the polymer compound has a side chain which has one or more azo groups and/or cynnamate groups, and 3 or more and 10 or less arylene groups; the side chain further has an optionally substituted amino group, or a hydrocarbon group at the terminal; and a content of the polymer compound in the composition is 71% by mass or more relative to the total solid content.

(22) A method of manufacturing a retardation film of (14), which comprises coating the composition of (21) over a substrate.

(23) The method of manufacturing a retardation film according to (22), which further comprises heating the composition, having been coated on the substrate, at 40° C. or above, and photo-irradiating the composition after heating at a dose of 300 to 30000 mJ/cm².

(24) A polarizing plate comprising a polarizer, and the retardation film of (14).

(25) A liquid crystal display device comprising the retardation film of (14).

(26) The liquid crystal display device of (25), which is an IPS liquid crystal display device.

This invention now makes it possible to provide a retardation film capable of demonstrating a high contrast and retardation. This invention can also provide a retardation film which satisfies desired optical characteristics. By using the composition and the method of manufacturing a retardation film of this invention, it now becomes possible to manufacture the retardation film of this invention. The polarizing plate and the liquid crystal display device of this invention show a high contrast.

DESCRIPTION OF EMBODIMENTS

This invention will be detailed below. In this specification, all numerical ranges given in the form of "to" preceded and succeeded by numerals are defined to contain these numerals as the lower and upper limit values. The solid content in the context of this specification means the solid content measured at 25° C.

In this specification, Re($\lambda$) represents in-plane retardation (nm) at wavelength $\lambda$. In this specification, the wavelength $\lambda$ is 550 nm, unless otherwise specifically noted. Re($\lambda$) may be measured using KOBRA 21ADH or WR, or KOBRA CCD Series (from Oji Scientific Instruments Co., Ltd.) by making light of wavelength 550 nm incident on the film in the direction of the normal line. The retardation may alternatively be measured using AxoScan (from Axometrics, Inc.).

In this invention, the "slow axis" of the retardation film or the like means the direction along which the refractive index appears maximum. The refractive index is measured at a wavelength $\lambda$ of 550 nm in the visible region, unless otherwise specifically noted.

In this specification, all numerical values and all numerical ranges, which represent optical characteristics of the individual components, are construed to represent numerical values, numerical ranges and properties which contain typical errors allowable for the liquid crystal display device and the components used therefor.

In this specification, weight average molecular weight and number average molecular weight are defined by polystyrene equivalent values measured by gel permeation chromatography (GPC). In this specification, the weight average molecular weight and the number average molecular weight (Mn) may be determined, for example, by using HLC-8220 (from Tosoh Corporation), and TSKgel (registered trademark) column Super AWM-H (from Tosoh Corporation, 6.0 mm ID×15.0 cm), at a column temperature of 40° C. Eluent used for the measurement is a 10 mmol/L lithium bromide solution in NMP (N-methylpyrrolidinone), unless otherwise specifically noted.

<Retardation Film>

The retardation film of this invention is a retardation film formed from a composition which contains a polymer compound, a rod-like liquid crystal compound, and a photo-reactive compound. The retardation film means a film showing birefringence over the entire area or a part thereof.

The retardation film of this invention may be a single layered film or a multi-layered film composed of a plurality of layers. The single layered film is preferable.

The in-plane retardation Re of the retardation film of this invention at wavelength of 550 nm is preferably 10 to 200 nm, and more preferably 10 to 150 nm.

The first retardation film of this invention preferably has an Nz value of 0.3 to 0.9, and more preferably 0.3 to 0.7. The second retardation film of this invention preferably has an Nz value of −0.29 to 0.29, more preferably −0.2 to 0.2, and in particular preferably −0.15 to 0.15.

Now, Nz=(nx−nz)/(nx−ny) holds, where nx represents refractive index in the in-plane slow axis direction, ny represents refractive index in the in-plane direction normal to nx, and nz represents refractive index in the direction normal to nx and ny.

The thickness of the retardation film of this invention is typically, but not specifically limited to, 10 µm or less, more preferably 5 µm or less, and even more preferably 3 µm or less. The lower limit of thickness is typically, but not specifically limited to, 10 nm or above, and preferably 50 nm or above.

The first retardation film of this invention may be formed by using a composition which contains a polymer compound having a side chain, a rod-like liquid crystal compound, and a photo-reactive compound. The method of manufacturing the film of this invention will be detailed later.

The second retardation film of this invention may be formed by using a composition which contains a polymer compound having certain side chain, and an alignment controlling agent. The method of manufacturing the film of this invention will be detailed later.

<<Polymer Compound>>

The polymer compound used in this invention has a side chain which contains one or more azo groups and/or cynnamate groups, and 3 or more and 10 or less arylene groups, and the side chain further has an optionally substituted amino group, or hydrocarbon group at the terminal. The polymer compound means a compound having a weight average molecular weight of 10000 or more, and is preferably a polymerized product of monomers.

The azo group is represented by —N=N—, and the cynnamate group is represented by —C₆H₄CH=CH—COO—. As a result of residence of one or more azo groups and/or cynnamate groups, the polymer compound is allowed to participate in the photo-reaction. In this invention, upon irradiated with polarized ultraviolet radiation, the azo group and/or cynnamate group induces dichroism due to cis-trans rearrangement, and thereby an optically anisotropic retardation film may be obtained. When isomerizing the polymer compound, by adding a step of heating in order to enhance the reactivity, domains of several tens to several micrometers are formed, although not so large as domains of several tens micrometers ever produced. The domains, possibly degrading the panel contrast, may be suppressed from being produced, by adding a photo-reactive compound which is highly compatible with the polymer. The present inventors also found that the refractive indices nx, ny and nz, which are known to vary depending on how the polymer compound aligns, may be varied by an additive.

The polymer compound used in this invention has a side chain which has 3 or more and 10 or less arylene groups, and the side chain further has an optionally substituted amino group, or hydrocarbon group at the terminal. The thus bound arylene moiety is structurally rigid, the number of which contributes the optical performance expression and thermal reactivity, wherein the range of "3 or more and 10 or less" is a suitable range for both properties. The amino group or hydrocarbon group at the terminal acts to enhance the optical performance expression when the polymer compound aligns, as compared with the case without amino group or hydrocarbon group.

The side chain preferably has one or more azo groups. The side chain more preferably has 3 or more and 8 or less arylene groups, and even more preferably has 4 or more and 7 or less arylene groups.

The side chain has an amino group or hydrocarbon group at the terminal. The amino group may be unsubstituted or may have a substituent, and preferably has a substituent. The substituent is exemplified by alkyl group having 1 to 10 carbon atoms (preferably having 1 to 5 carbon atoms, and in particular preferably having 1 to 3 carbon atoms), and alkoxy group having 1 to 9 carbon atoms (preferably having 1 to 4 carbon atoms, and in particular preferably having 1 or 2 carbon atoms). The substituent on the amino group is preferably alkyl group having 1 to 10 carbon atoms (preferably having 1 to 5 carbon atoms, and in particular preferably having 1 to 3 carbon atoms). The alkyl groups may mutually combine to form a ring.

The hydrocarbon group is an alkyl group, alkenyl group or alkynyl group preferably having 1 to 20 carbon atoms, more preferably 3 to 20 carbon atoms, even more preferably 3 to 10 carbon atoms, and yet more preferably 3 to 7 carbon atoms, and may have any form of straight chain, branched chain, cyclic structure, and combination of them.

The polymer compound is exemplified by those of terminal connection type having the side chain which is bound at the terminal thereof, through a spacer or single bond, to the principal chain; and those of side connection type having the side chain which is bound inside thereof (laterally), through a spacer to the principal chain.

The terminal-connection-type polymer compound is preferably a compound represented by Formula IX below.

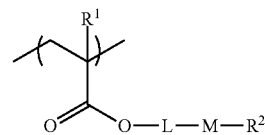

Formula IX

In the formula, $R^1$ represents a hydrogen atom or methyl group.

In the formula, L represents a single bond, $-(CH_2)_xO-$ (x is an integer of 2 to 10, preferably 2 to 6), or $-(CH_2CH_2O)_y-$ (y is an integer of 1 to 5, preferably 1 to 3). $-(CH_2)_xO-$ is preferable.

In the formula, $R^2$ represents an optionally substituted amino group, or hydrocarbon group.

In the formula, M represents a structure represented by Formula X below.

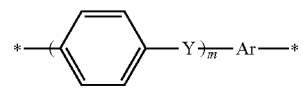

Formula X

In the formula, each * represents a bonding site with L or $R^2$; Y represents an azo group, $-OCO-$, $-CO(=O)-$, $-OCO-CH=CH-$ or $-CH=CH-CO_2-$, m represents an integer of 2 to 9, the plurality of (Y)s may be same or different; and Ar represents an optionally substituted arylene group (preferably a phenylene group).

The polymer compound represented by Formula IX is preferably exemplified by a polymer compound represented by Formula (IX-a) below.

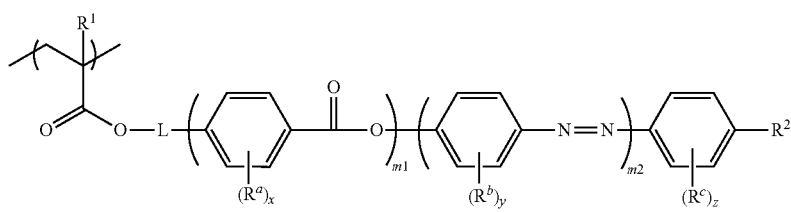

(IX-a)

In the formula, all symbols same as those used in Formula IX are synonymous, and defined by the same preferable ranges.

In the formula, m1 represents 1 or 2, and m2 represents 1 or 2.

Each of $R^a$, $R^b$ and $R^c$ independently represents a substituent (preferably, alkyl group having 1 or 2 carbon atoms, or halogen atom (preferably fluorine atom or chlorine atom)).

Each of x, y, and z independently represents an integer of 0 to 4, and preferably 0.

Preferable examples of the polymer represented by Formula IX above include polymers represented by Formulae (IX-b) and (IX-c) below, which contain $-OCO-CH=CH-$ group or $-CH=CH-CO_2-$ group for Y.

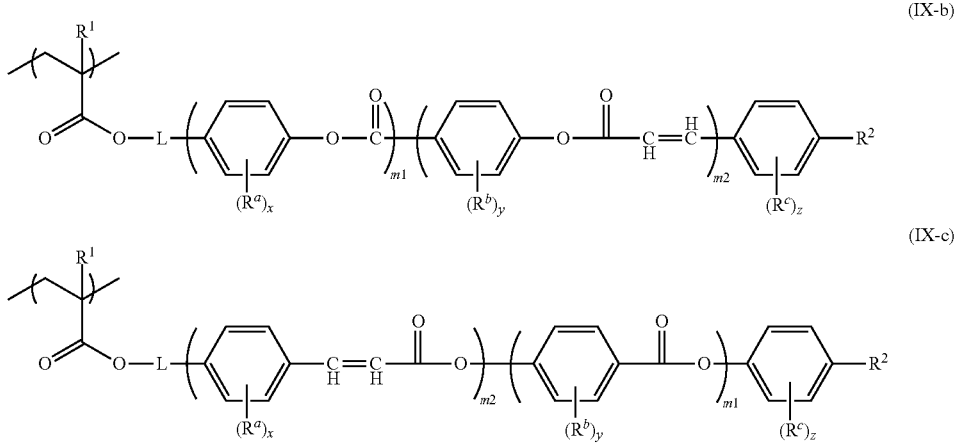

(IX-b)

(IX-c)

In the formula, all symbols same as those used in Formula IX are synonymous, and defined by the same preferable ranges.

In the formula, m1 represents an integer of 0 to 2, and m2 represents an integer of 1 or 2. Each of $R^a$, $R^b$ and $R^c$ independently represents a substituent (preferably, alkyl group having 1 or 2 carbon atoms, or halogen atom (preferably, fluorine atom, chlorine atom)); and each of x, y and z independently represents an integer of 0 to 4.

The side connection type polymer compound is preferably a compound represented by Formula XI below.

Formula XI

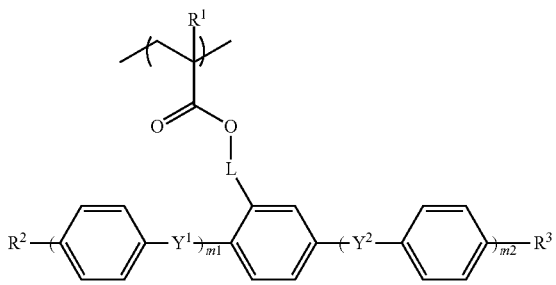

In the formula, $R^1$ represents a hydrogen atom or methyl group.

In the formula, L represent a single bond, —$(CH_2)_xO$— (x is an integer of 2 to 10, and preferably 2 to 6) or —$(CH_2CH_2O)_y$— (y is an integer of 1 to 6, and preferably 3 to 6).

In the formula, each of $R^2$ and $R^3$ independently represents a hydrogen atom, alkyl group having 1 to 10 carbon atoms (preferably having 1 to 5 carbon atoms, and in particular preferably 1 to 3), alkoxy group having 1 to 9 carbon atoms (preferably 1 to 4 carbon atoms, and in particular preferably 1 or 2), or optionally substituted amino group.

In the formula, each of $Y^1$ and $Y^2$ independently represents an azo group, —OCO—CH=CH— or —CH=CH—$CO_2$—, and each of m1 and m2 independently represents an integer of 1 or 2. When m1 or m2 represents 2, the plurality of ($Y^1$)s or ($Y^2$)s may be same or different.

As for methods of synthesizing the polymer compound, those described for example in *Jikken Kagaku Koza*, in Japanese, "*The Series of Experimental Chemistry*", (4th Ed., No. 28, *Kobunshi Gosei*, in Japanese, "*Polymer Synthesis*", p. 120-160) may be referred to.

The polymer compound is exemplified by compounds described in paragraphs [0053] to [0055] of JP-A-2011-237513. Among them, those having no cyano group at the terminal of the side chain are preferably used in this invention.

The weight average molecular weight of the polymer compound is preferably, but not specifically limited to, 10000 to 100000, more preferably 10000 to 50000, and even more preferably 10000 to 30000.

The content of the polymer compound in the first retardation film of this invention is preferably 30 to 99% by mass, more preferably 50 to 95% by mass, and most preferably 71 to 95% by mass. A single species of the polymer compound may be used independently, or two or more species may be used in combination. When two or more species are used, the total content preferably satisfies the contents described above.

The content of the polymer compound in the second retardation film of this invention is 71% by mass or more, preferably 75% by mass or more, more preferably 80% by mass or more, and even more preferably 90% by mass or more. The upper limit of the content of polymer compound is preferably 99.9% by mass or below, more preferably 99% by mass or below, and even more preferably 97% by mass or below. When two or more species are used in combination, the total content preferably satisfies the contents described above.

<<Rod-Like Liquid Crystal Compound>>

The rod-like liquid crystal compound was found to be enhanced in the retardation expression under the same conditions of manufacturing. Although the mechanism remains partially unclear, the present inventors suppose that the rod-like liquid crystal compound assists the photo-alignment of the polymer compound. Too much addition of the rod-like liquid crystal compound will, however, degrade the panel contrast due to self-alignable nature of liquid crystal, so that the amount of addition may be controlled within a suitable range.

The rod-like liquid crystal compound suitably used includes azomethines, azoxys, cyanobiphenyls, cyanophenyl esters, benzoic esters, phenyl cyclohexane carboxylates, cyanophenylcyclohexanes, cyano-substituted phenylpyrimidines, alkoxy-substituted phenylpyrimidines, phenyldioxanes, tolans and alkenylcyclohexylbenzonitriles. The rod-like liquid crystal compound is preferably polymerizable rod-like liquid crystal compound having a polymerizable group, but may alternatively be rod-like liquid crystal compound having no polymerizable group. The rod-like liquid crystal compound is, in particular, preferably a compound having a structure represented by Formula (I) below.

$$Q1\text{-}SP1\text{-}X1\text{-}M_1\text{-}(Y1\text{-}L\text{-}Y2\text{-}M_2)n\text{-}X2\text{-}SP2\text{-}Q2 \quad \text{Formula (I):}$$

In the formula,
n is an integer of 0 or more, which denotes the number of repetition of (Y1-L-Y2-M$_2$),
each of Q1 and Q2 represents a polymerizable group,
each of SP1 and SP2 represents a straight-chain or branched alkylene group, or a group composed of a straight-chain or branched alkylene group combined with at least one of —O— and —C(=O)—, having a total number of carbon atoms of 2 to 8 in integer;
each of X1 and X2 represents a single bond or oxygen atom;
—Y1-L-Y2- represents a straight-chain alkylene group, or a group composed of straight-chain alkylene group and —O— and/or —C(=O)—, having a total number of carbon atoms of 3 to 18 in integer; and each of M$_1$ and M$_2$ configures a mesogenic group. In this specification, the mesogenic group means a group having a rod-like or plate-like rigid structure (aromatic ring, etc.).

able group (e.g., ethylenic unsaturated group) or ring-opened polymerizable group (e.g., epoxy group, oxetane group), and more preferably an acryloyl group or methacryloyl group.

Each of SP1 and SP2 represents a so-called spacer group, which is a structure for linking the polymerizable group and the mesogenic group.

The spacer group is preferably an alkylene group having 2 to 12 carbon atoms, or an alkylene oxide having 2 to 12 carbon atoms.

Each of X1 and X2 represents a linking group, and is selectable from single bond and oxygen atom.

n represents an integer of 0 or more. Since increase in the value "n" means that a liquid crystal molecule contains a polymerized mesogenic groups, so that an obtainable optically anisotropic layer will be less likely to shrink by polymerization when it is formed. n is preferably an integer of 0 to 3, more preferably an integer of 0 to 2, and even more preferably an integer of 0 or 1.

Each of Ar1, Ar2 and Ar3 independently represents phenylene or biphenylene substituted by any number of bromine atom(s), methyl group(s) or methoxy group(s). The total number of benzene rings contained in Ar1, Ar2 or Ar3 is preferably an integer of 3 to 6, more preferably an integer of 3 to 5, and in particular preferably an integer of 3 or 4.

Examples of the rod-like liquid crystal compound will be shown below, but not limited thereto.

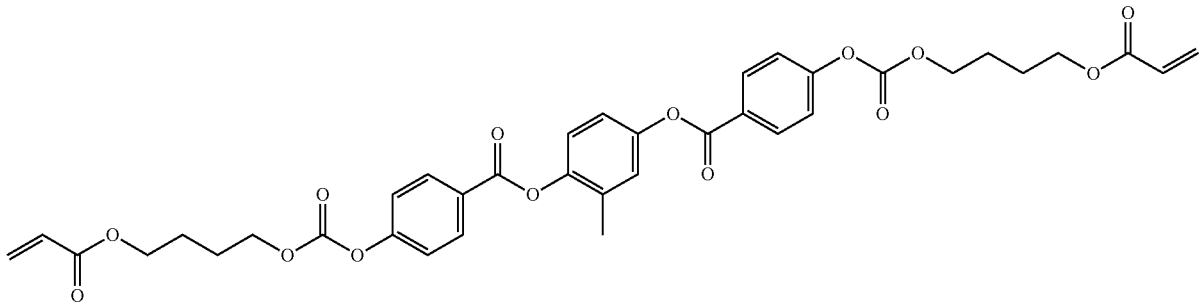

M$_1$ is a group represented by

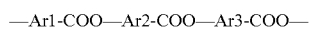
—Ar1-COO—Ar2-COO—Ar3-COO— or

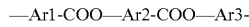
—Ar1-COO—Ar2-COO—Ar3- or

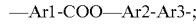
—Ar1-COO—Ar2-Ar3-;

M$_2$ is a group represented by

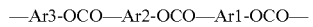
—Ar3-OCO—Ar2-OCO—Ar1-OCO— or

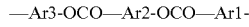
—Ar3-OCO—Ar2-OCO—Ar1- or

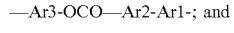
—Ar3-OCO—Ar2-Ar1-; and each of Ar1, Ar2 and Ar3 independently represents phenylene or biphenylene substituted by an arbitrary number of bromine atom(s), methyl group(s), or methoxy group(s).

Each of the polymerizable groups Q1 and Q2 is preferably an acryloyl group, methacryloyl group, radical polymeriz- <<Photo-Reactive Compound>>

The photo-reactive compound suitably used in this invention is a compound which is characterized by that an absolute value of difference between the SP (solubility parameter) value of the polymer compound and the SP value of the photo-reactive compound is 1.1 or less, and which is reactive to light to initiate a polymerization reaction. The photo-reactive compound used in this invention preferably functions to disperse the polymer compound described above.

The SP value refers to solubility parameter, which may be calculated for low-molecular substances by using the Hoy method suited to low-molecular substances, and for polymers by using the Hoy method suited to polymers. The absolute value of difference between the SP value of the polymer compound and the SP value of the photo-reactive compound is preferably 1.1 or less, and the closer the value to zero, the better. By using a photo-reactive compound having such SP value, the polymer compound and the photo-reactive compound become more compatible, so that the polymer compound, if driven to form domains, will be interrupted by the photo-reactive compound, and thereby the domains, which are causative of degradation in panel contrast, may be suppressed from growing.

Examples of the photo-reactive compound include acetophenones, benzoins, benzophenones, phosphine oxides, ketals, anthraquinones, thioxanthones, azo compounds, peroxides (JP-A-2001-139663, etc.), 2,3-dialkyldione compounds, disulfide compounds, fluoroamine compounds, aromatic sulfoniums, lophin dimers, onium salts, borates, active esters, active halogens, inorganic complexes, and coumarins.

Examples of acetophenones include 2,2-dimethoxyacetophenone, 2,2-diethoxyacetophenone, p-dimethylacetophenone, 1-hydroxydimethyl phenyl ketone, 1-hydroxydimethyl p-isopropylphenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone, and 4-t-butyl-dichloroacetophenone.

Examples of benzoins include benzoin, benzoin methyl ether, benzoin ethyl ether, benzoin isopropyl ether, benzyl dimethyl ketal, benzoin benzenesulfonic ester, benzoin toluenesulfonic ester, benzoin methyl ether, benzoin ethyl ether and benzoin isopropyl ether.

Examples of benzophenones include benzophenone, hydroxybenzophenone, 4-benzoyl-4'-methyldiphenyl sulfide, 2,4-dichlorobenzophenone, 4,4-dichlorobenzophenone or p-chlorobenzophenone, 4,4'-dimethylaminobenzophenone (Michler ketone), and 3,3',4,4'-tetra(t-butylperoxycarbonyl)benzophenone.

Borates are exemplified by organic borate compounds described, for example, in official gazettes including JP-B2-2764769, JP-A-2002-116539 and so forth, and Martin Kunz, "Rad Tech '98 Proceeding, April, p. 19-22, 1998, Chicago". They are exemplified by the compounds described in paragraphs [0022] to [0027] of JP-A-2002-116539. Other organic boron compounds are specifically exemplified by organoboron transition metal coordination complexes typically described in JP-A-H06-348011, JP-A-H07-128785, JP-A-H07-140589, JP-A-H07-306527 and JP-A-H07-292014, and more specifically by ion complexes with cationic dye.

Examples of phosphine oxides include 2,4,6-trimethylbenzoyldiphenylphosphine oxide.

Examples of active esters include 1,2-octanedione, 1-[4-(phenylthio)-, 2-(O-benzyloxime)], sulfonic esters, and cyclic active ester compounds. More specifically, Compounds 1 to 21 described in EXAMPLE of JP-A-2000-80068 are particularly preferable.

Examples of onium salts include aromatic diazonium salts, aromatic iodonium salts and aromatic sulfonium salts.

Active halogens are specifically exemplified by the compounds described in Wakabayashi et al., *Bull Chem. Soc. Japan*, Vol. 42, p. 2924 (1969), U.S. Pat. No. 3,905,815, JP-A-H05-27830, M. P. Hutt, *Journal of Heterocyclic Chemistry*, Vol. 1 (No. 3) (1970), and particularly by oxazole compound substituted by trihalomethyl group, and s-triazine compound. More preferably, exemplified are s-triazine derivatives having at least one mono-, di- or trihalogenated methyl group substituted on the s-triazine ring. Known specific examples include s-triazine and oxathiazole compound, such as 2-(p-methoxyphenyl)-4,6-bis(trichloromethyl)-s-triazine, 2-(p-methoxyphenyl)-4,6-bis(trichloromethyl)-s-triazine, 2-(p-styrylphenyl)-4,6-bis(trichloromethyl)-s-triazine, 2-(3-bromo-4-di(ethyl acetate)amino)phenyl)-4,6-bis(trichloromethyl)-s-triazine, and 2-trihalomethyl-5-(p-methoxyphenyl)-1,3,4-oxadiazole. Particularly preferable examples are those described in pages 14 to 30 of JP-A-S58-15503, pages 6 to 10 of JP-A-S55-77742, Compounds No. 1 to No. 8 on page 287 of JP-B2-S60-27673, Compounds No. 1 to No. 17 on pages 443 to 444 of JP-A-S60-239736, and Compounds Nos. 1 to 19 of U.S. Pat. No. 4,701,399.

Examples of inorganic complexes include ($\eta^5$-2,4-cyclopentadiene-1-yl)-bis(2,6-difluoro-3-(1H-pyrrole-1-yl)-phenyl)titanium.

Examples of coumarins include 3-ketocoumarin.

These initiators may be used independently, or as a mixture.

Commercially available photo-reactive compounds are exemplified by Kayacure (registered trademark) (DETX-S, BP-100, BDMK, CTX, BMS, 2-EAQ, ABQ, CPTX, EPD, ITX, QTX, BTC, MCA, etc.) from Nippon Kayaku Co., Ltd., Irgagure (registered trademark) (651, 184, 500, 819, 907, 369, 1173, 1870, 2959, 4265, 4263, etc.) from BASF, and Esacure (registered trademark) (KIP100F, KB1, EB3, BP, X33, KT046, KT37, KIP150, TZT) from Sartomer, Inc.

<Alignment Controlling Agent>

The alignment controlling agent used in this invention is a compound which influences on the state of alignment when the polymer compound is photo-aligned. As the alignment controlling agent, compounds having at least two aromatic rings are preferably used. The "aromatic ring" includes not only aromatic hydrocarbon ring, but also aromatic heterocycle.

The aromatic hydrocarbon ring is preferably a 6-membered ring (i.e., benzene ring).

The aromatic heterocycle is typically an unsaturated heterocycle. The aromatic heterocycle is preferably a 5-membered ring, 6-membered ring or 7-membered ring, and more preferably a 5-membered ring or 6-membered ring. The heteroatom in the heterocycle is preferably a nitrogen atom, oxygen atom or sulfur atom, among which nitrogen atom is particularly preferable. Examples of the aromatic heterocycle include furan ring, thiophene ring, pyrrole ring, oxazole ring, isooxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring.

The aromatic hydrocarbon ring is preferably a benzene ring, condensed benzene ring, or biphenyls.

As the aromatic ring, in particular 1,3,5-triazine ring is preferably used.

More specifically, compounds typically disclosed in JP-A-2001-166144 are preferably used.

The aromatic ring contained in the alignment controlling agent preferably has 2 to 20 carbon atoms, more preferably 2 to 12, even more preferably 2 to 8, and in particular preferably 2 to 6. In view of the number of ring-forming atoms, the aromatic ring is preferably a 5- to 7-membered ring, and more preferably a 5-membered ring or 6-membered ring.

Modes of connection of two aromatic rings are classified into (a) a mode of forming a condensed ring, (b) a mode of direct connection through a single bond, and (c) a mode of connection through a linking group (aromatic ring cannot form a spiro union). The modes of connection may be any of (a) to (c).

Examples of the (a) condensed ring (condensed ring formed by two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzooxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acrydine ring, phenanthridine ring, xanthene ring, phenazine ring, phenothiazine ring, phenoxathiine ring, phenoxazine ring and thianthrene ring. Naphthalene ring, azulene ring, indole ring, benzooxazole ring, benzothiazole ring, benzoimidazole ring, benzotriazole ring and quinoline ring are preferable.

The single bond in (b) is preferably a bond between carbon atoms of two aromatic rings. Two or more single bonds may combine two aromatic rings to form, between the two aromatic rings, an aliphatic ring or non-aromatic heterocycle.

Also the linking group in (c) is preferably bound to carbon atoms of two aromatic rings. The linking group is preferably an alkylene group, alkenylene group, alkynylene group, —CO—, —O—, —NH—, —S— or combination of them. Examples of linking group based on the combination will be listed below. Note that the examples of the linking group shown below may be laterally inverted.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- Each of aromatic ring and linking group may optionally have a substituent.

Examples of the substituent include halogen atom (F, Cl, Br, I), hydroxy group, carboxy group, cyano group, amino group, nitro group, sulfo group, carbamoyl group, sulfamoyl group, ureido group, alkyl group, alkenyl group, alkynyl group, aliphatic acyl group, aliphatic acyloxy group, alkoxy group, alkoxycarbonyl group, alkoxycarbonylamino group, alkylthio group, alkyl sulfonyl group, aliphatic amido group, aliphatic sulfoamido group, aliphatic-substituted amino group, aliphatic-substituted carbamoyl group, aliphatic-substituted sulfamoyl group, aliphatic-substituted ureido group and non-aromatic heterocyclic group.

The alkyl group preferably has 1 to 8 carbon atoms. Chain-like alkyl group is preferred over cyclic alkyl group, and straight chain-like alkyl group is particularly preferable. The alkyl group may additionally have a substituent (e.g., hydroxy group, carboxy group, alkoxy group, alkyl-substituted amino group). Examples of the alkyl group (including substituted alkyl group) include methyl group, ethyl group, n-butyl group, n-hexyl group, 2-hydroxyethyl group, 4-carboxybutyl group, 2-methoxyethyl group and 2-diethylamino ethyl group.

The alkenyl group preferably has 2 to 8 carbon atoms. Chain-like alkenyl group is preferred over cyclic alkenyl group, and straight chain-like alkenyl group is particularly preferable. The alkenyl group may additionally have a substituent. Examples of the alkenyl group include vinyl group, allyl group and 1-hexenyl group.

The alkynyl group preferably has 2 to 8 carbon atoms. Chain-like alkynyl group is preferred over cyclic alkynyl group, and straight chain-like alkynyl group is particularly preferable. The alkynyl group may optionally have a substituent. Examples of the alkynyl group include ethynyl group, 1-butynyl group and 1-hexynyl group.

The aliphatic acyl group preferably has 1 to 10 carbon atoms. Examples of the aliphatic acyl group include acetyl group, propanoyl group and butanoyl group.

The aliphatic acyloxy group preferably has 1 to 10 carbon atoms. Examples of the aliphatic acyloxy group include acetoxy group.

The alkoxy group preferably has 1 to 8 carbon atoms. The alkoxy group may additionally have a substituent (e.g., alkoxy group). Examples of the alkoxy group (including substituted-alkoxy group) include methoxy group, ethoxy group, butoxy group and methoxyethoxy group.

The alkoxycarbonyl group preferably has 2 to 10 carbon atoms. Examples of the alkoxycarbonyl group include methoxycarbonyl group and ethoxycarbonyl group.

The alkoxycarbonylamino group preferably has 2 to 10 carbon atoms. Examples of the alkoxycarbonylamino group include methoxycarbonylamino group and ethoxycarbonylamino group.

The alkylthio group preferably has 1 to 12 carbon atoms. Examples of the alkylthio group include methylthio group, ethylthio group and octylthio group.

The alkylsulfonyl group preferably has 1 to 8 carbon atoms. Examples of alkyl sulfonyl group include methanesulfonyl group and ethanesulfonyl group.

The aliphatic amido group preferably has 1 to 10 carbon atoms. Examples of the aliphatic amido group include acetamide.

The aliphatic sulfonamido group preferably has 1 to 8 carbon atoms. Examples of the aliphatic sulfonamido group include methanesulfonamido group, butanesulfonamido group and n-octanesulfonamido group.

The aliphatic-substituted amino group preferably has 1 to 10 carbon atoms. Examples of the aliphatic-substituted amino group include dimethylamino group, diethylamino group and 2-carboxyethylamino group.

The aliphatic-substituted carbamoyl group preferably has 2 to 10 carbon atoms. Examples of the aliphatic-substituted carbamoyl group include methylcarbamoyl group and diethylcarbamoyl group.

The aliphatic-substituted sulfamoyl group preferably has 1 to 8 carbon atoms. Examples of the aliphatic-substituted sulfamoyl group include methylsulfamoyl group and diethylsulfamoyl group.

The aliphatic-substituted ureido group preferably has 2 to 10 carbon atoms. Examples of the aliphatic-substituted ureido group include methylureido group.

Examples of the non-aromatic heterocyclic group include piperidino group and morpholino group.

The alignment controlling agent preferably has a molecular weight of 300 to 800.

The alignment controlling agent is preferably represented by Formula (I) below

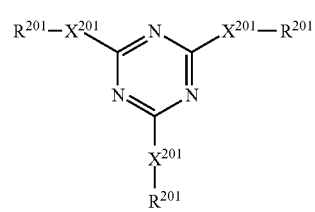

Formula (I)

In Formula (I):

each $R^{201}$ independently represents an aromatic hydrocarbon ring or a heterocycle, which has substituent(s) at least on any of the ortho, meta and para positions.

Each $X^{201}$ independently represents a single bond or $-NR^{202}-$. Each $R^{202}$ independently represents a hydrogen atom, or alkyl group, alkenyl group, aromatic hydrocarbon cyclic group or heterocyclic group, which may be substituted or unsubstituted.

The aromatic hydrocarbon ring represented by $R^{201}$ is preferably a phenyl group or naphthyl group, wherein phenyl group is particularly preferable. The aromatic hydrocarbon ring represented by $R^{201}$ may have at least one substituent at any position of substitution. Examples of the substituent include halogen atom, hydroxy group, cyano group, nitro group, carboxy group, alkyl group, alkenyl group, aromatic hydrocarbon cyclic group, alkoxy group, alkenyloxy group, aryloxy group, acyloxy group, alkoxycarbonyl group, alkenyloxycarbonyl group, aryloxycarbonyl group, sulfamoyl group, alkyl-substituted sulfamoyl group, alkenyl-substituted sulfamoyl group, aryl-substituted sulfamoyl group, sulfonamido group, carbamoyl group, alkyl-substituted carbamoyl group, alkenyl-substituted carbamoyl group, aryl-substituted carbamoyl group, amido group, alkylthio group, alkenylthio group, arylthio group and acyl group.

The heterocyclic group represented by $R^{201}$ preferably shows aromaticity. In most cases, heterocycles showing aromaticity are unsaturated heterocycles, preferably having the largest possible number of double bonds. The heterocycle is preferably a 5-membered ring, 6-membered ring or 7-membered ring, more preferably 5-membered ring or 6-membered ring, and even more preferably 6-membered ring. The heteroatom in the heterocycle is preferably nitrogen atom, sulfur atom or oxygen atom, and in particular preferably nitrogen atom. The heterocycle showing aromaticity is, in particular, preferably pyridine ring (2-pyridyl or 4-pyridyl group, in terms of heterocyclic group). The heterocyclic group may have a substituent. Examples of the substituents of the heterocyclic group are same as those of the aromatic hydrocarbon ring described above.

When $X^{201}$ represents a single bond, the heterocyclic group preferably has a free valence on the nitrogen atom. The heterocyclic group having a free valence on the nitrogen atom is preferably 5-membered ring, 6-membered ring or 7-membered ring, more preferably 5-membered ring or 6-membered ring, and in particular preferably 5-membered ring. The heterocyclic group may have a plurality of nitrogen atoms. The heterocyclic group may also have a heteroatom (e.g., O, S) other than nitrogen atom. Examples of the heterocyclic group having a free valence on the nitrogen atom will be listed below. Now $-C_4H_9^n$ represents n-$C_4H_9$.

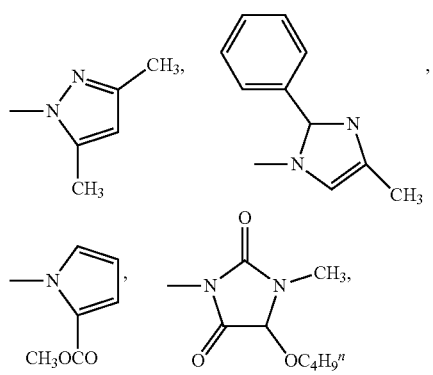

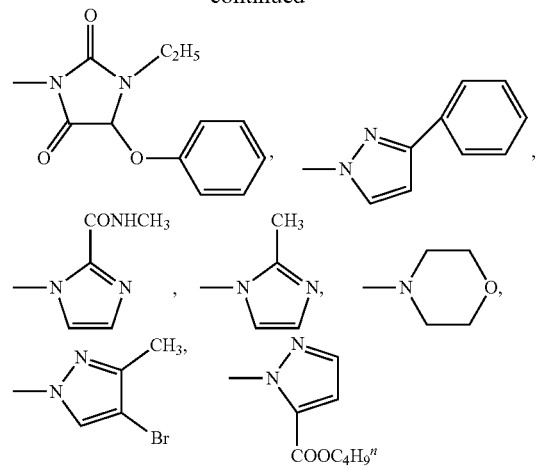

The alkyl group represented by $R^{202}$ may be a cyclic alkyl group or a chain-like alkyl group, wherein chain-like alkyl group is preferable, and straight chain-like alkyl group is preferred over branched chain-like alkyl group. The alkyl group preferably has 1 to 30 carbon atoms, more preferably has 1 to 20 carbon atoms, even more preferably 1 to 10, yet more preferably 1 to 8, and most preferably 1 to 6. The alkyl group may have a substituent. Examples of the substituent include halogen atom, alkoxy group (e.g., methoxy group, ethoxy group) and acyloxy group (e.g., acryloyloxy group, methacryloyloxy group).

The alkenyl group represented by $R^{202}$ may be a cyclic alkenyl group or a chain-like alkenyl group, wherein chain-like alkenyl group is preferable, and straight chain-like alkenyl group is preferred over branched chain-like alkenyl group. The alkenyl group preferably has 2 to 30 carbon atoms, more preferably has 2 to 20 carbon atoms, even more preferably 2 to 10, yet more preferably 2 to 8, and most preferably 2 to 6. The alkenyl group may have a substituent. Examples of the substituent are same as those of the alkyl group descried above.

The aromatic hydrocarbon cyclic group and the heterocyclic group represented by $R^{202}$ are same as the aromatic hydrocarbon ring and the heterocycle represented by $R^{201}$. The preferable ranges are the same as those for the aromatic hydrocarbon ring and the heterocycle represented by $R^{201}$. The aromatic hydrocarbon cyclic group and the heterocyclic group may additionally have a substituent. Examples of the substituent are same as those of the aromatic hydrocarbon ring and the heterocycle represented by $R^{201}$.

The compound represented by Formula (I) may be synthesized typically by any of the known methods, including a method described, for example, in JP-A-2003-344655. The alignment controlling agent is detailed in JIPII Journal of Technical Disclosure No. 2001-1745, p. 49. The agent is described as an optical performance expressing agent in the publication of application described above.

The content of the alignment controlling agent in the retardation film of this invention, relative to 100 parts by mass of the polymer compound, is preferably 0.1 to 20 parts by mass, more preferably 1 to 20 parts by mass, and even more preferably 1 to 15 parts by mass. Only one species of the alignment controlling agent may be used independently, or two or more species may be used in combination. When two or more species are used in combination, the total content preferably satisfies the content described above.

<Composition>

The composition of this invention (also referred to as "composition for retardation film", hereinafter) contains the polymer compound, the rod-like liquid crystal compound, and the photo-reactive compound.

The content of the polymer compound in the composition for retardation film, relative to the total solid content in the composition, is preferably 30 to 99% by mass, more preferably 50 to 95% by mass, and most preferably 71 to 95% by mass.

The content of the rod-like liquid crystal compound in the composition for retardation film, relative to 100 parts by mass of the polymer compound in the composition for retardation film, is preferably 0.1 to 40 parts by mass, more preferably 1 to 20 parts by mass, and even more preferably 3 to 10 parts by mass.

The content of the photo-reactive compound in the composition for retardation film, relative to 100 parts by mass of the polymer compound in the composition for retardation film, is preferably 0.1 to 40 parts by mass, more preferably 1 to 20 parts by mass, and even more preferably 3 to 15 parts by mass.

The composition of this invention (also referred to as "composition for retardation film", hereinafter) contains the polymer compound, and the alignment controlling agent.

The content of the polymer compound in the composition for retardation film, relative to the total solid content in the composition, is 71% by mass or more, preferably 75% by mass or more, even more preferably 80% by mass or more, and yet more preferably 90% by mass or more. The upper limit of content of the polymer compound is preferably 99.9% by mass or below, more preferably 99% by mass or below, and even more preferably 97% by mass or below.

The content of the alignment controlling agent in the composition for retardation film, relative to 100 parts by mass of the polymer compound in the composition for retardation film, is preferably 0.1 to 20 parts by mass, more preferably 1 to 20 parts by mass, and even more preferably 1 to 15 parts by mass.

The composition of this invention may contain a solvent if necessary. Organic solvent is preferably used for the solvent. Examples of the organic solvent include amide (e.g., N,N-dimethylformamide), sulfoxide (e.g., dimethyl sulfoxide), heterocyclic compound (e.g., pyridine), hydrocarbon (e.g., benzene, hexane), alkyl halide (e.g., chloroform, dichloromethane), ester (e.g., methyl acetate, butyl acetate), ketone (e.g., acetone, methyl ethyl ketone, cyclohexanone), and ether (e.g., tetrahydrofuran, 1,2-dimethoxyethane). Alkyl halide and ketone are preferable. Two or more species of organic solvents may be used in combination. The amount of the solvent is preferably, but not specifically limited to, 1 to 30% by mass and more preferably 1 to 10% by mass.

<Method of Manufacturing Retardation Film>

The method of manufacturing a retardation film of this invention includes at least a step of coating the above-described composition for retardation film on a substrate, and a step of photo-irradiating the coated composition. It is preferable for the method of manufacturing a retardation film of this invention to further include a step of heating the composition, having been coated on the substrate, to 40° C. or above, and a step of irradiating the heated composition with a polarized light at a dose of 300 to 30000 mJ/cm$^2$.

<<Step of Coating Composition for Retardation Film on Substrate>>

The composition for retardation film is preferably coated, for example, over the surface of a substrate such as polymer film, glass plate or quartz plate, and if necessary, over the surface of an alignment film having been formed over the substrate. Preferable methods of coating include spin coating, air knife coating, curtain coating, roller coating, wire bar coating, gravure coating and die coating. Wire bar coating is preferable. The amount of coating is preferably controlled so that a desired thickness of the retardation film may be manufactured.

<<Step of Heating Composition Coated on Substrate>>

The method of manufacturing of this invention preferably includes a step of heating the composition having been coated in the step of coating described above. The step of drying may be implemented typically by a method of heating the substrate, having the coated film (coated composition) formed thereon, on a heated hot plate. The step of drying may alternatively be carried out by blowing the coated film with air heated to a predetermined temperature.

The heating temperature is preferably 40° C. or above, more preferably 40 to 80° C., and even more preferably 50° C. to 70° C. The heating time is preferably 5 seconds to 600 seconds, more preferably 5 seconds to 200 seconds, and even more preferably 10 seconds to 100 seconds.

<<Step of Photo-Irradiating Coated Composition>>

In the step of photo-irradiation, the film formed on the substrate is irradiated with light.

The photo-irradiation may be given either by polarized light or non-polarized light, wherein polarized light is preferably used, and linear polarized light is more preferably used. Under photo-irradiation with polarized light, polarizability of the film may be expressed, and thereby the retardation film with a controlled polarizability may be manufactured.

The photo-irradiation with linear polarized light is an operation for inducing photo-reaction of the photo-reactive compound and the polymer compound having the azo group and/or cynnamate group. The wavelength of light employed here varies depending on the photo-reactive compound to be used, and is not specifically limited so long as it is necessary for photo-reaction. The light used for the photo-irradiation preferably has a peak wavelength in the range from 200 to 700 nm, and is preferably UV light having a peak wavelength at 400 nm or shorter.

Means for obtaining the linear polarized light, suitably used here, include methods of using a polarizing plate (e.g., iodine polarizing plate, dichroic dye-containing polarizing plate, wire grid polarizing plate); methods of using a prism element (e.g., Glan-Thompson prism) or reflective polarizer based on Brewster's angle; and methods of using light emitted from intrinsically polarized laser source. Alternatively, only light of a necessary wavelength may selectively be irradiated, using a filter or wavelength conversion element.

Light source used for the photo-irradiation may be exemplified by those widely used, including lamps such as tungsten lamp, halogen lamp, xenon lamp, xenon flash lamp, mercury lamp, mercury-xenon lamp and carbon arc lamp; various types of laser (e.g., semiconductor laser helium neon laser, argon ion laser, helium cadmium laser, yttrium aluminum garnet (YAG) laser), light emitting diode, and cathode ray tube.

When the polymer compound is irradiated with linear polarized light, the azo group or the cynnamate group, whose long molecular axis being aligned in parallel with the electric field vector, predominantly absorbs photons to cause trans-to-cis rearrangement, to thereby induce dichroism. The slow axis of the retardation layer in this process is aligned parallel to the linear polarized light.

The light is irradiated on the film normally or obliquely from the top, or from the back. The incident angle of light may vary depending on species of the photo-reactive compound or the polymer compound having azo group(s) and/or cynnamate group(s), and is preferably 0 to 80° to the surface of the polymer film, preferably 40 to 800, and even more preferably 50 to 700.

The irradiation dose is preferably 300 to 30000 mJ/cm$^2$, and more preferably 1000 to 20000 mJ/cm$^2$. By controlling the irradiation dose, the state of alignment of the azo groups or cynnamate groups in the polymer compound may be changed, and thereby the Nz value of the retardation film may be controlled. In this invention, the retardation film having a desired Nz value may be manufactured, by controlling the irradiation dose depending on the Nz value required for the retardation film.

[Polarizing Plate]

The retardation film of this invention is useful, in particular, as a protective film for polarizing plate. The polarizing plate of this invention may be manufactured by any of ordinary methods without special limitation. One known method is such as optionally treating the retardation film of this invention with an alkali, and bonding, using an adhesive, the film to the surface of a polarizer which is manufactured by stretching a polyvinyl alcohol film while dipped in an iodine solution. The adhesive is exemplified by polyvinyl alcohol-based adhesive containing polyvinyl alcohol, polyvinyl butyral or the like; and vinyl-based latex containing butyl acrylate or the like.

The polarizing plate is configured by a polarizer and two polarizing plate protective films for protecting both surfaces of the polarizer. The retardation film of this invention may be used for at least one of the two polarizing plate protective films.

<Liquid Crystal Display Device>

The liquid crystal display device of this invention has the above-described retardation film, or the polarizing plate of this invention.

The liquid crystal display device is configured by a liquid crystal cell having a liquid crystal cell and two electrode substrates holding it in between, two polarizer plates disposed on both sides thereof, and at least one retardation film disposed between the liquid crystal cell and each polarizer. The liquid crystal layer of the liquid crystal cell is typically formed by injecting a liquid crystal, into a space formed between two substrates disposed while placing a spacer in between. A transparent electrode layer is formed as a transparent film which contains an electro-conductive material, on the substrate. The liquid crystal cell may additionally be provided with a gas barrier layer, hard coat layer, or under coat layer (used for bonding with the transparent electrode layer). In most cases, these layers are provided on the substrate. The substrate of the liquid crystal cell is preferably 50 μm to 2 mm thick.

There are proposed various display modes including TN (Twisted Nematic), IPS (In-Plane Switching), FLC (Ferroelectric Liquid Crystal), AFLC (Anti-Ferroelectric Liquid Crystal), OCB (Optically Compensatory Bend), STN (Super Twisted Nematic), VA (Vertically Aligned), ECB (Electrically Controlled Birefringence), and HAN (Hybrid Aligned Nematic). Also proposed are display modes using the above-described display modes implemented in a multi-domain configuration. Among these modes, this invention is in particular suitably applicable to IPS-mode liquid crystal display device. These liquid crystal display devices may be any of transmission type, reflection type, and half-transmission type. As for the liquid crystal display devices, the description of paragraphs [0136] to [0142] of JP-A-2010-79239 may be referred to, the content of which is incorporated into this specification.

This invention will be described in further detail, referring to Examples. The materials, amounts of use, ratios, details of processes, procedures of processes and so forth may suitably be modified without departing from the spirit of this invention. The scope of this invention is therefore not limited to the specific examples described below.

EXAMPLES

Example A

Manufacture of Alkali-Saponified Transparent Support

TD60UL (from FUJIFILM Corporation) was allowed to pass over an induction heated roll at 60° C. to thereby elevate the film surface temperature up to 40° C., then coated on one surface with 14 ml/m$^2$ of an alkaline solution having the composition below using a bar coater, heated to 110° C., and allowed to travel under a steam far infrared heater from Noritake Co., Ltd. for 10 seconds. Then, 3 ml/m$^2$ of pure water was coated again using a bar coater. After repeating rinsing with water using a fountain coater, and dewatering using an air knife three times, the film was transferred to a drying zone at 70° C. and allowed to travel for 10 seconds for drying. An alkali-saponified support was thus manufactured.

| Composition of Alkali Solution | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

<Formation of Alignment Film>

On the alkali-saponified surface of the alkali-saponified support, a coating liquid for forming alignment film (A) having the composition below was continuously coated using a #14 wire bar. The coating was dried with a hot air at 60° C. for 60 seconds, and then with a hot air at 100° C. for 120 seconds. The degree of saponification of the modified polyvinyl alcohol used here was found to be 96.8%.

| Composition of Coating Liquid for Forming Alignment Film (A) | |
|---|---|
| Modified polyvinyl alcohol (a/b/c = 12/88/0), shown below | 10 parts by mass |
| Water | 308 parts by mass |
| Methanol | 70 parts by mass |
| Isopropanol | 29 parts by mass |
| Photo-polymerization initiator (Irgacure (registered trademark) 2959, from BASF) | 0.8 parts by mass |

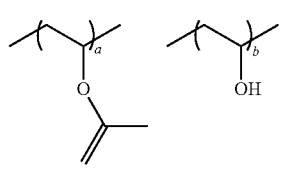

-continued

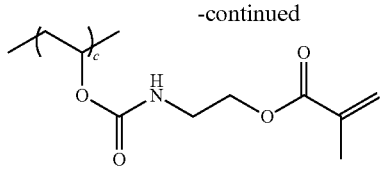

Preparation of Composition for Retardation Film

Example A1

One hundred parts by mass of Polymer Compound 1 below, 5 parts by mass of Rod-Like Liquid Crystal Compound 1 below, 10 parts by mass of Photo-Reactive Compound 1 below (Irgacure (registered trademark) 907), and 775 parts by mass of methyl ethyl ketone were mixed to prepare a composition for retardation film.

Examples A2 to A7, Comparative Examples A1 to A11

Compositions for retardation film were manufactured in the same way as in Example A1, except that the compounds used in Example A1 were changed to the compounds listed in Table below.

Absolute values of (SP value of polymer compound−SP value of photo-reactive compound) were listed in Table.

Polymer Compound 1

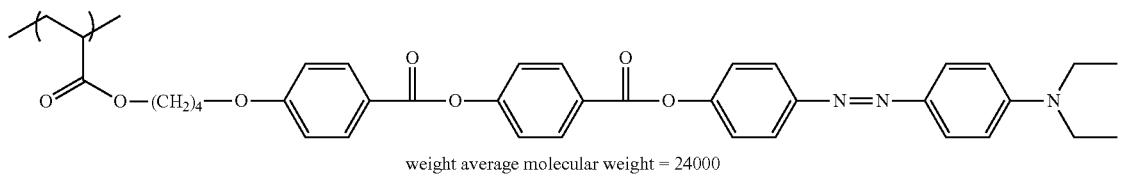

weight average molecular weight = 24000

Polymer Compound 2

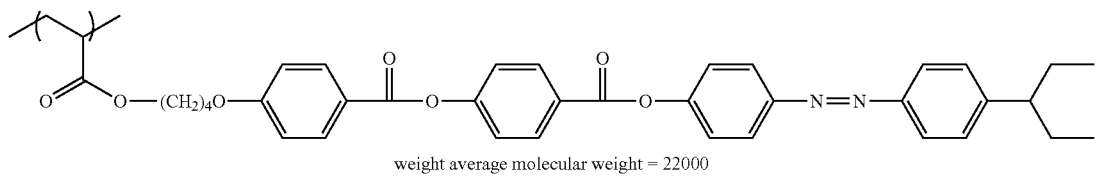

weight average molecular weight = 22000

Polymer Compound 3

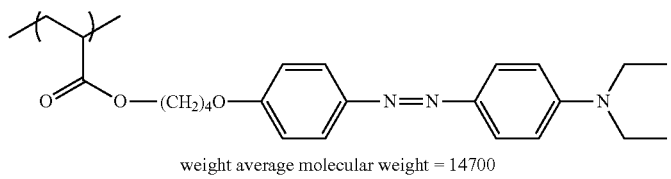

weight average molecular weight = 14700

Polymer Compound 4

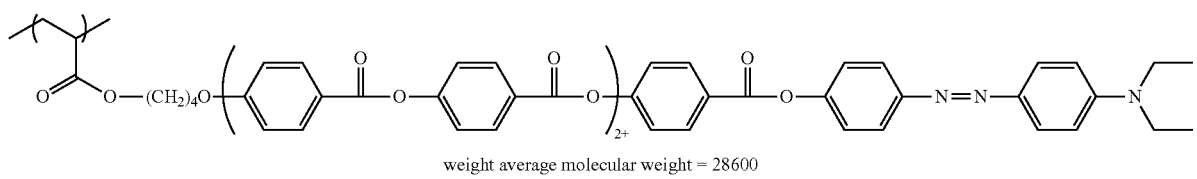

weight average molecular weight = 28600

Polymer Compound 5

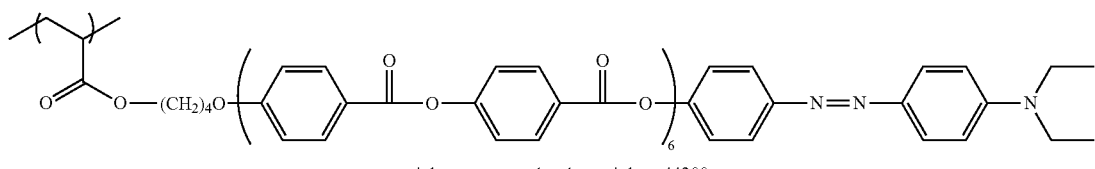

weight average molecular weight = 44300

Polymer Compound 6
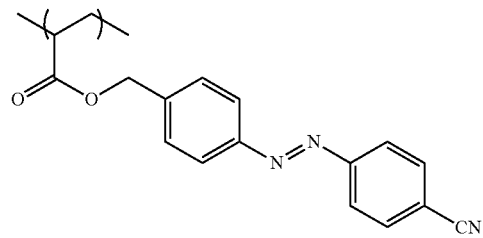
weight average molecular weight = 14000
Rod-Like Crystal Compound 1
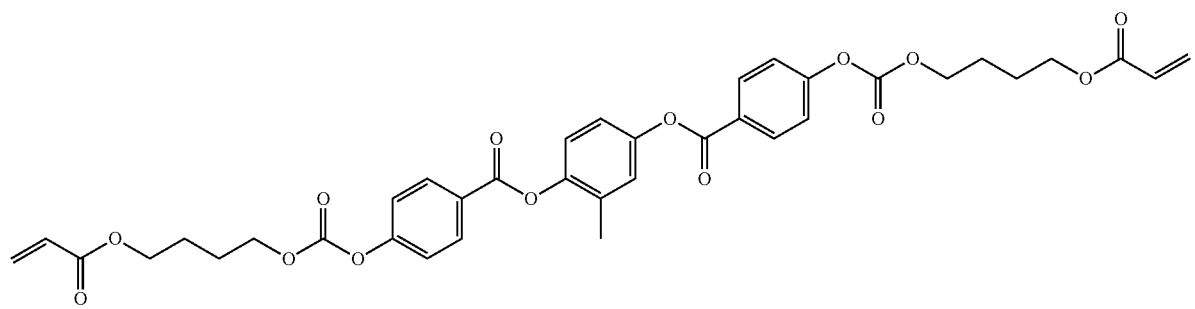 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]
Discotic Liquid Crystal Compound 1
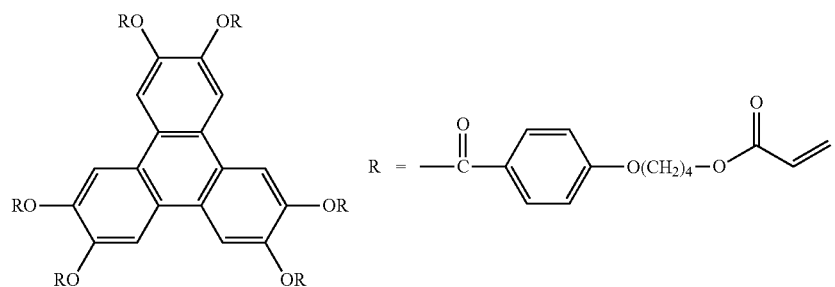
Discotic Liquid Crystal Compound 2
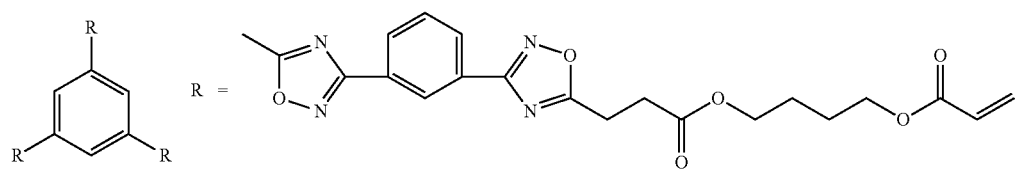
Photo-Reactive Compound 1
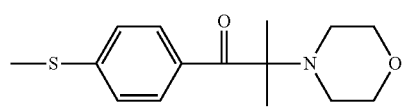
(Irgacure (registered trademark) 907, from BASF)
Photo-Reactive Compound 2
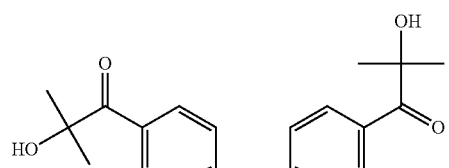
(Irgacure 127, from BASF)
Photo-Reactive Compound 3
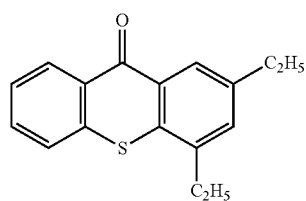

Manufacture of Retardation Film

Example A1

A retardation film of Example A1 was manufactured according to the method below.

On the alignment film manufactured above, the composition for retardation film of Example A1 was coated using a bar coater, so as to give a dry film thickness of 0.4 μm. The coated film was conveyed under heating at 60° C. for 30 seconds in order to enhance mobility of the polymer compound, and then exposed to ultraviolet radiation (UV) at 148 mW through a polarizing plate, for a period of time the dose listed in Table may be reached. A retardation film of Example A1 was manufactured in this way.

Comparative Example A1

A retardation film of Comparative Example A1 was manufactured according to the method below.

The alignment film manufactured above was continuously rubbed. In this process, the longitudinal direction of the long film was aligned parallel to the feed direction, and an angle between the longitudinal direction of the long film and the axis of rotation of a rubbing roller was set to 0°. Next, the composition for retardation film of Comparative Example A1 was bar-coated on the thus rubbed alignment film so as to give a dry thickness of 0.6 μm. The film was then heated using a hot air at 130° C. for 150 seconds in order to dry off the solvent in the coating liquid, and to align and ripen the liquid crystal compound, and irradiated by UV at 80° C. to fix the alignment of the liquid crystal compound. A retardation film was manufactured in this way.

Comparative Example A2

A retardation film was manufactured by coating under the same conditions as in Comparative Example A1, except that the composition for retardation film of Comparative Example A2 was used and the dry film thickness was 0.6 μm.

Examples A2 to A7, Comparative Examples A3 to A11

Retardation films were manufactured by coating under the same conditions as in Example A1, except that the dry film thickness and UV dose were changed to those listed in Table, and that compositions for retardation film of Examples A2 to A7 and Comparative Examples A3 to A11 were used.

<Evaluation of Retardation Film>
<<Re and Nz>>

Re and Nz at wavelength of 550 nm were measured using AxoScan from Axometics, Inc. Results are summarized in Table.

<<Contrast>>

Contrast was evaluated by a method below.

Each retardation film was held between two polarizing plates, maximum luminance and minimum luminance were measured using a luminance meter (BM5, from Topcon Technohouse Corporation), and a film contrast value was obtained using Equation (1) below.

$$\text{Film contrast value} = 1 \div [1 \div \{(\text{Minimum luminance of retardation film disposed between two polarizing plates in parallel Nicol state}) \div (\text{Minimum luminance of retardation film disposed between two polarizing plates in cross Nicol state})\} - 1 \div \{(\text{Minimum luminance observed through two polarizing plates in parallel Nicol state without retardation film in between}) \div (\text{Minimum luminance observed through two polarizing plates in cross Nicol state without retardation film in between})\}] \quad \text{Equation (1):}$$

<Manufacture of Polarizing Plate>

Each of the retardation films manufactured in Examples and Comparative Examples, and Fujitac (registered trademark) TD60UL (from FUJIFILM Corporation) were dipped in a 4.5 mol/L aqueous sodium hydroxide solution (saponification liquid) conditioned at 37° C. for 1 minute, rinsed with water, further dipped in a 0.05 mol/L aqueous sulfuric acid solution for 30 seconds, and allowed to pass through a water rinsing bath. Each film was dewatered three times using an air knife, then allowed to stand in a drying zone at 70° C. for 15 seconds for drying, to thereby manufacture a saponified film.

A polyvinyl alcohol film of 120 μm thick was immersed in an aqueous solution containing 1 part by mass of iodine, 2 parts by mass of potassium iodide, and 4 parts by mass of boric acid, and stretched four-fold at 50° C., to thereby manufacture a polarizer.

The polarizer obtained above was held between two selected sheets of the saponified films, and then bonded roll-to-roll using a 3% aqueous PVA (PVA-117H, from Kuraray Co., Ltd.) solution as an adhesive, while aligning the polarization axis normal to the longitudinal direction of film. Now, one of the polarizing films used here was any of the films of Examples or Comparative Examples after saponified, and the other film used here was Fujitac TD60UL which was saponified.

Note that, for the case where the retardation layer was formed by direct coating on the polarizing plate, followed by ripening, drying and UV irradiation, the step of manufacturing polarizing plate was omitted.

<Manufacture of Liquid Crystal Display Device>

A liquid crystal cell of iPad (registered trademark of Apple Inc.) was used as an IPS-mode liquid crystal cell, after peeling off the polarizing plate on the viewer's side.

In place of the thus-removed polarizing plate, each of the polarizing plates manufactured above was bonded to the liquid crystal cell, to manufacture the individual liquid crystal display devices. In the process of bonding, the absorption axis of the polarizing plate and the optical axis of the liquid crystal layer in the liquid crystal cell were aligned normal to each other, when the liquid crystal cell was observed in the direction normal to the substrate plane. Each of the thus bonded liquid crystal display device was illuminated to confirm that images were displayed without problems.

TABLE 1

| | Polymer Compound | | | | Liquid Crystalline Compound Species (parts by mass) | Photo-Reactive Compound Species (parts by mass) | SP value difference from polymer | Dry Film Thickness μm | UV Irradiation Conditions | | Evaluation | | |
|---|---|---|---|---|---|---|---|---|---|---|---|---|---|
| | Species | Photo-Reactive Group | Terminal Group | Number of Arylene Groups in Side Chain | | | | | Illuminance (mW/cm²) | Dose (mJ/cm²) | Re (nm) | Contrast | Nz |
| Example A1 | Polymer Compound 1 | Azo | Amino | 4 | Rod-Like Liquid Crystal Compound 1 (5) | Photo-Reactive Compound 1 (10) | 1.0 | 0.4 | 148 | 1480 | 83 | 110000 | 0.37 |
| Example A2 | Polymer Compound 1 | Azo | Amino | 4 | Rod-Like Liquid Crystal Compound 1 (5) | Photo-Reactive Compound 1 (10) | 1.0 | 0.7 | 148 | 1480 | 140 | 100000 | 0.35 |
| Example A3 | Polymer Compound 2 | Azo | Alkyl | 4 | Rod-Like Liquid Crystal Compound 1 (5) | Photo-Reactive Compound 1 (10) | 1.0 | 0.4 | 148 | 1480 | 90 | 100000 | 0.75 |
| Comparative Example A1 | None | — | — | — | Rod-Like Liquid Crystal Compound 1 (100) | Photo-Reactive Compound 1 (10) | — | 0.6 | 148 | 1480 | 80 | 3500 | 1.0 |
| Comparative Example A2 | None | — | — | — | Discotic Liquid Crystal Compound 1 (100) | Photo-Reactive Compound 1 (10) | — | 0.4 | 148 | 1480 | 20 | 4500 | 1.48 |
| Comparative Example A3 | Polymer Compound 1 | Azo | Amino | 4 | None | None | — | 0.4 | 148 | 1480 | 50 | 40000 | 0.33 |
| Comparative Example A4 | Polymer Compound 3 | Azo | Amino | 2 | Rod-Like Liquid Crystal Compound 1 (5) | Photo-Reactive Compound 1 (10) | — | 0.4 | 148 | 1480 | 9 | 100000 | 0.35 |
| Example A4 | Polymer Compound 4 | Azo | Amino | 7 | Rod-Like Liquid Crystal Compound 1 (5) | Photo-Reactive Compound 1 (10) | 0.32 | 0.4 | 148 | 1480 | 145 | 90000 | 0.40 |
| Comparative Example A5 | Polymer Compound 5 | Azo | Amino | 14 | Rod-Like Liquid Crystal Compound 1 (5) | Photo-Reactive Compound 1 (10) | — | 0.4 | 148 | 1480 | 75 | 3000 | −0.5 |
| Comparative Example A6 | Polymer Compound 6 | Azo | Cyano | 2 | Rod-Like Liquid Crystal Compound 1 (5) | Photo-Reactive Compound 1 (10) | — | 0.4 | 148 | 1480 | 5 | 120000 | 1.24 |
| Example A5 | Polymer Compound 1 | Azo | Amino | 4 | Rod-Like Liquid Crystal Compound 1 (5) | Photo-Reactive Compound 1 (10) | 1.0 | 0.4 | 148 | 3900 | 145 | 110000 | 0.85 |
| Example A6 | Polymer Compound 1 | Azo | Amino | 4 | Rod-Like Liquid Crystal Compound 1 (5) | Photo-Reactive Compound 1 (10) | 1.0 | 0.4 | 148 | 7800 | 145 | 110000 | 0.45 |
| Example A7 | Polymer Compound 1 | Azo | Amino | 4 | Rod-Like Liquid Crystal Compound 1 (5) | Photo-Reactive Compound 1 (10) | 1.0 | 0.4 | 148 | 15000 | 145 | 110000 | 0.37 |
| Comparative Example A7 | Polymer Compound 1 | Azo | Amino | 4 | Rod-Like Liquid Crystal Compound 1 (5) | None | — | 0.4 | 148 | 1480 | 55 | 35000 | 0.3 |
| Comparative Example A8 | Polymer Compound 1 | Azo | Amino | 4 | Discotic Liquid Crystal Compound 1 (5) | Photo-Reactive Compound 1 (10) | 1.0 | 0.4 | 148 | 1480 | 40 | 44000 | 0.24 |
| Comparative Example A9 | Polymer Compound 1 | Azo | Amino | 4 | Discotic Liquid Crystal Compound 2 | Photo-Reactive Compound 1 (10) | 1.0 | 0.4 | 148 | 1480 | 52 | 20000 | 0.23 |

TABLE 1-continued

| | | | | | (5) | | | | | | | | |
|---|---|---|---|---|---|---|---|---|---|---|---|---|---|
| Comparative Example A10 | Polymer Compound 1 | Azo | Amino | 4 | Rod-Like Liquid Crystal Compound 1 | Photo-Reactive Compound 2 | 1.2 | 0.4 | 148 | 1480 | 70 | 60000 | 0.35 |
| Comparative Example A11 | Polymer Compound 1 | Azo | Amino | 4 | Rod-Like Liquid Crystal Compound 1 | Photo-Reactive Compound 3 | 1.4 | 0.4 | 148 | 1480 | 65 | 40000 | 0.33 |

Summary of Examples

The retardation films of Examples A1 to A7 which satisfy the conditions of this invention and was manufactured using the polymer compounds, the rod-like liquid crystal compound and the photo-reactive compound, were found to achieve remarkably high levels of contrast in the state where in-plane retardation was expressed, and also to achieve Nz=0.3 to 0.9. The retardation films of Comparative Examples A1 and A2, which did not contain the polymer compound specified by this invention, failed to achieve Nz=0.3 to 0.9. The retardation film of Comparative Example A3, which contained neither the rod-like liquid crystal compound nor the photo-reactive compound, showed only a low contrast. Comparative Example A5, having the number of arylene groups in the side chain of the polymer compound out of the range specified by this invention, showed only a low contrast, and failed to achieve Nz=0.3 to 0.9. Comparative Example A6, having a cyano group at the terminal of the side chain of the polymer compound, failed to express the in-plane retardation specified by this invention, and also failed to achieve Nz=0.3 to 0.9. The retardation film of Comparative Example A7 containing no photo-reactive compound, those of Comparative Examples A8 and A9 containing no rod-like liquid crystal compounds, and those of Comparative Examples A10 and A11 having the SP values fallen outside the range of this invention showed only low values of contrast. Comparative Examples A8 and A9 failed to achieve Nz=0.3 to 0.9.

Example B

Manufacture of Alkali-Saponified Transparent Support

TD60UL (from FUJIFILM Corporation) was allowed to pass over an induction heated roll at 60° C. to thereby elevate the film surface temperature up to 40° C., then coated on one surface with 14 ml/m$^2$ of an alkaline solution having the composition below using a bar coater, heated to 110° C., and allowed to travel under a steam far infrared heater from Noritake Co., Ltd. for 10 seconds. Then, 3 ml/m$^2$ of pure water was coated again using a bar coater. After repeating rinsing with water using a fountain coater, and dewatering using an air knife three times, the film was transferred to a drying zone at 70° C. and allowed to travel for 10 seconds for drying. An alkali-saponified support was thus manufactured.

| Composition of Alkali Solution | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

<Formation of Alignment Film>

On the alkali-saponified surface of the alkali-saponified support, a coating liquid for forming alignment film (A) having the composition below was continuously coated using a #14 wire bar. The coating was dried with a hot air at 60° C. for 60 seconds, and then with a hot air at 100° C. for 120 seconds. The degree of saponification of the modified polyvinyl alcohol used here was found to be 96.8%.

| Composition of Coating Liquid for Forming Alignment Film (A) | |
|---|---|
| Modified polyvinyl alcohol shown below (a/b/c = 12/88/0) | 10 parts by mass |
| Water | 308 parts by mass |
| Methanol | 70 parts by mass |
| Isopropanol | 29 parts by mass |
| Photo-polymerization initiator (Irgacure (registered trademark) 2959, from BASF) | 0.8 parts by mass |

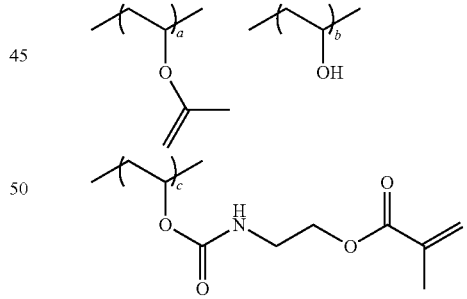

Preparation of Composition for Retardation Film

Example B1

One hundred parts by mass of Polymer Compound 1 below, 20 parts by mass of Alignment controlling Agent 1 below, and 775 parts by mass of methyl ethyl ketone were mixed to prepare a composition for retardation film of Example B1.

Polymer Compound 1

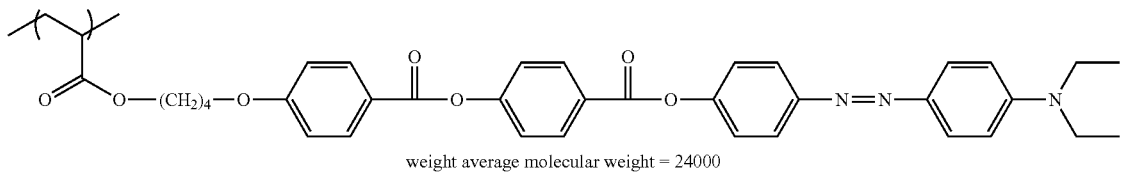

weight average molecular weight = 24000

Alignment controlling Agent 1

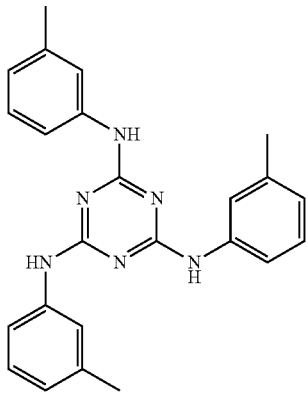

Comparative Example B1

Ninety-one parts by mass of Liquid Crystalline Compound 1 below, 5.2 parts by mass of Low Molecular Compound 1 below, 0.09 parts by mass of Alignment controlling Agent 2 below, 0.25 parts by mass of Alignment controlling Agent 3 below, 3 parts by mass of Polymerization Initiator 1 below, 1 part by mass of sensitizer below, and 775 parts by mass of methyl ethyl ketone were mixed to prepare a composition for retardation film of Comparative Example B1.

Liquid Crystalline Compound 1

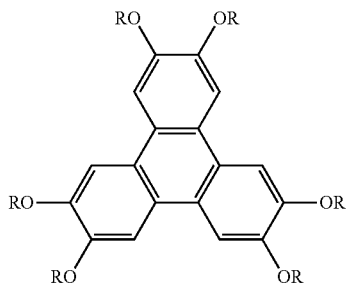

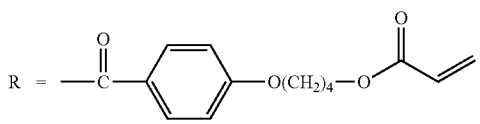

-continued

Low Molecular Compound 1

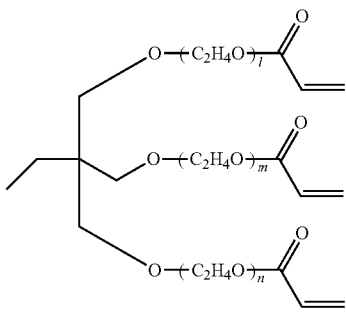

$l + m + n = 3$

Alignment controlling Agent 2

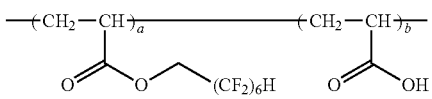

B1365
(B1365, a/b = 92/8, from Wako Pure Chemical Industries, Ltd.)

Alignment controlling Agent 3

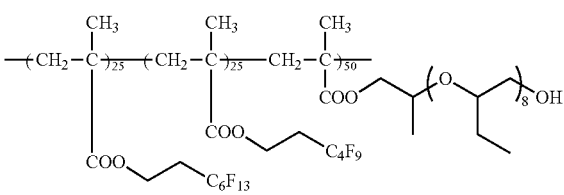

B1258
(B1258, a/b/c = 25/25/50, from DIC Corporation)

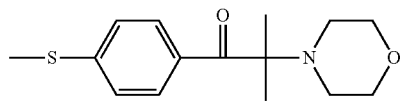

Photo-Polymerization Initiator: PM2215 (from BASF)

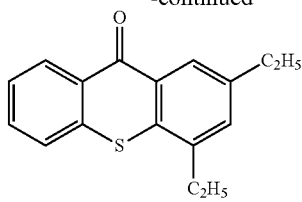

PM758
Sensitizer: PM758 (from Nippon Kayaku Co., Ltd.)

Comparative Example B2

Seventy-five parts by mass of Liquid Crystalline Compound 2 below, 25 parts by mass of Liquid Crystalline Compound 3 below, 0.35 parts by mass of Alignment controlling Agent 4 below, 3 parts by mass of Photo-Polymerization Initiator 1 above, 1 part by mass of sensitizer above, and 775 parts by mass of methyl ethyl ketone were mixed, to thereby prepare a composition for retardation film of Comparative Example B2.

Manufacture of Retardation Film

Example B1

A retardation film of Example B1 was manufactured according to the method below

On the alignment film manufactured above, the composition for retardation film of Example B1 was coated using a bar coater, so as to give a dry film thickness of 0.4 μm. The coated film was conveyed under heating at 60° C. for 30 seconds in order to enhance mobility of the polymer compound, and then exposed to ultraviolet radiation (UV) at 148 mW through a polarizing plate, for a period of time the dose listed in Table may be reached. A retardation film of Example B1 was manufactured in this way.

Note that, while this Example uses the alignment film as a base, the film with equivalent performances may also be obtained by coating in the same way, even on a glass substrate or on an ordinary polarizer.

Comparative Example B1

A retardation film of Comparative Example B1 was manufactured according to the method below.

Liquid Crystalline Compound 2

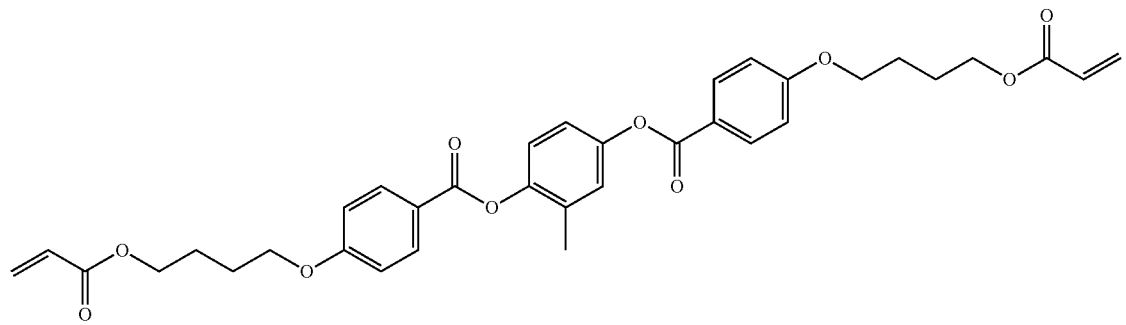

NLO2224

Liquid Crystalline Compound 3

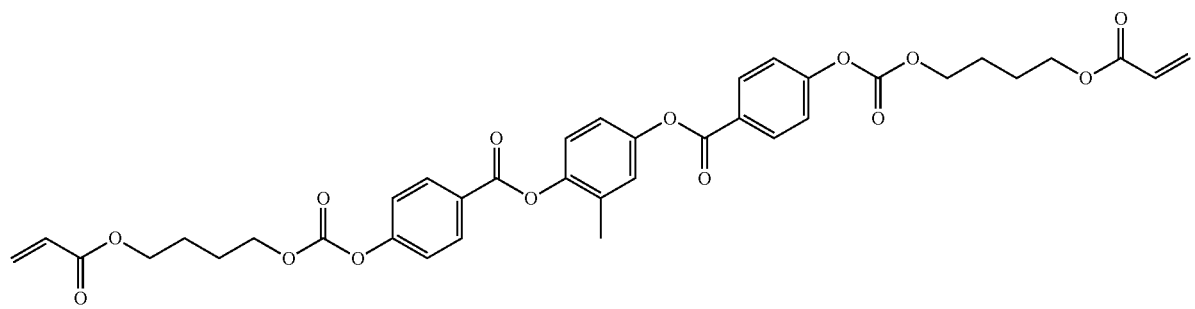

NLO2222

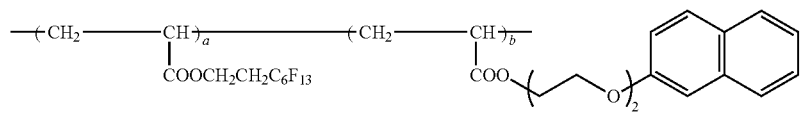

Alignment controlling Agent 4 (B1279, a/b = 32.5/67.5, from Wako Pure Chemical Industries, Ltd.)

The alignment film manufactured above was continuously rubbed. In this process, the longitudinal direction of the long film was aligned parallel to the feed direction, and an angle between the longitudinal direction of the long film and the axis of rotation of a rubbing roller was set to 0°. Next, the composition for retardation film of Comparative Example B1 was bar-coated on the thus rubbed alignment film so as to give a dry thickness of 0.4 μm. The film was then heated using a hot air at 130° C. for 150 seconds in order to dry off the solvent in the coating liquid, and to align and ripen the liquid crystal compound, and irradiated by UV at 80° C. to fix the alignment of the liquid crystal compound. A retardation film was manufactured in this way.

Comparative Example B2

A retardation film was manufactured in the same way as in Example B1, except that the composition for retardation film of Comparative Example B2 was used and the condition was changed to include heating for alignment and ripening using a hot air at 60° C. for 150 seconds, and UV irradiation at 60° C.

Example B2

A retardation film was manufactured in the same way as in Example B1, except that the dry film thickness was changed to 1.5 μm.

Example B3

A retardation film was manufactured in the same way as in Example B1, except that the dry film thickness was changed to 2.8 μm.

Comparative Example B3

A retardation film was manufactured in the same way as in Example B1, except that the composition was prepared by changing the amount addition of Alignment controlling Agent 1 to zero parts by mass.

Example B4

A retardation film was manufactured in the same way as in Example B1, except that the amount of addition of Alignment controlling Agent 1 was changed to 5 parts by mass.

Comparative Example B4

A retardation film was manufactured in the same way as in Example B1, except that the amount of addition of Alignment controlling Agent 1 was changed to 45 parts by mass.

Comparative Example B5

A retardation film was manufactured in the same way as in Example B1, except that the amount of addition of Alignment controlling Agent 1 was changed to 60 parts by mass.

Example B5

A retardation film was manufactured in the same way as in Example B1, except that the polymer compound was changed to Polymer Compound 2 below, and that the dry film thickness was changed to 1.5 μm.

Polymer Compound 2

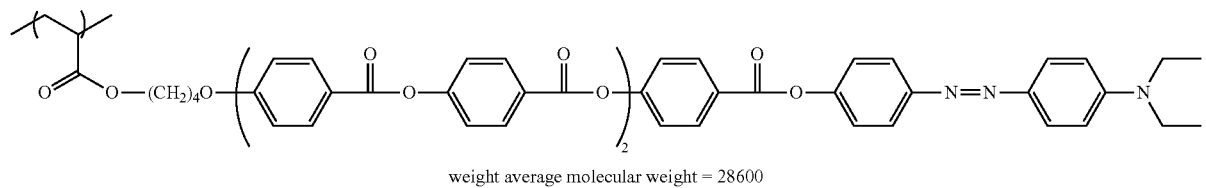

weight average molecular weight = 28600

Comparative Example 6

A retardation film was manufactured in the same way as in Example B1, except that the polymer compound was changed to Polymer Compound 3 below, and that the dry film thickness was changed to 2.8 μm.

Polymer Compound 3

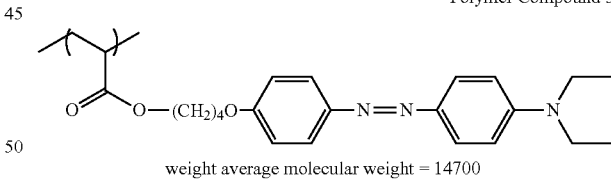

weight average molecular weight = 14700

Comparative Example B7

A retardation film was manufactured in the same way as in Example B1, except that the polymer compound was changed to Polymer Compound 4 below.

Polymer Compound 4

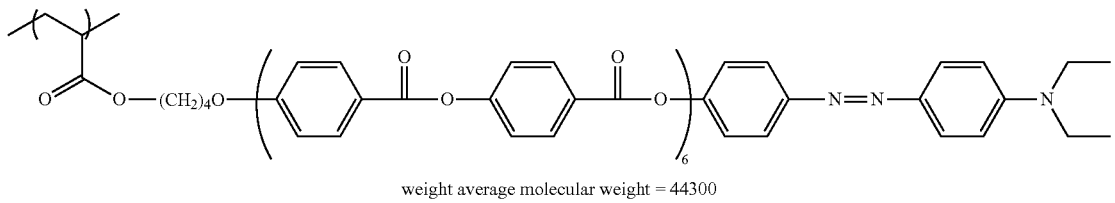

weight average molecular weight = 44300

Example B6

A retardation film was manufactured in the same way as in Example B1, except that the polymer compound was changed to Polymer Compound 5 below, and that the dry film thickness was changed to 1.5 μm.

Polymer Compound 5

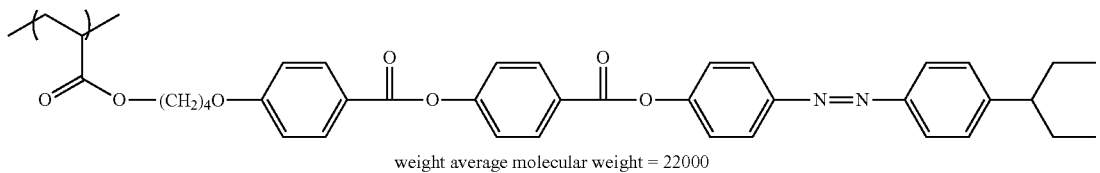

weight average molecular weight = 22000

Comparative Example B8

A retardation film was manufactured in the same way as in Example B1, except that 75 parts by mass of Liquid Crystalline Compound 2 and 25 parts by mass of Liquid Crystalline Compound 3 were used in place of Polymer Compound 1, and that the amount of addition of Alignment controlling Agent 1 was changed to 5 parts by mass.

<Evaluation of Retardation Film>
<<Re and Nz>>

Re and Nz at wavelength of 550 nm were measured using AxoScan from Axometics, Inc. Results are summarized in Table.

<<Contrast>>

Contrast was evaluated by a method below.

Each retardation film was held between two polarizing plates, maximum luminance and minimum luminance were measured using a luminance meter (BM5, from Topcon Technohouse Corporation), and a film contrast value was obtained using Equation (1) below.

Film contrast value=1÷[1÷{(Minimum luminance of retardation film disposed between two polarizing plates in parallel Nicol state)÷(Minimum luminance of retardation film disposed between two polarizing plates in cross Nicol state)}−1÷{(Minimum luminance observed through two polarizing plates in parallel Nicol state without retardation film in between)÷(Minimum luminance observed through two polarizing plates in cross Nicol state without retardation film in between)}]   Equation (1):

<Manufacture of Polarizing Plate>

Each of the retardation films manufactured in Examples and Comparative Examples, and TD60UL (from FUJIFILM Corporation) was dipped in a 4.5 mol/L aqueous sodium hydroxide solution (saponification liquid) conditioned at 37° C. for one minute, and rinsed with water, dipped in a 0.05 mol/L aqueous sulfuric acid solution for 30 seconds, and further allowed to pass through a rinsing water bath. The film was dewatered three times using an air knife, then allowed to stand in a drying zone at 70° C. for 15 seconds for drying. A saponified film was thus manufactured.

A polyvinyl alcohol film of 120 μm thick was immersed in an aqueous solution containing 1 part by mass of iodine, 2 parts by mass of potassium iodide, and 4 parts by mass of boric acid, stretched four-fold at 50° C., to thereby manufacture a polarizer.

The polarizer obtained above was held between two selected sheets of the saponified films, and then bonded roll-to-roll using a 3% aqueous PVA (PVA-117H, from Kuraray Co., Ltd.) solution as an adhesive, while aligning the polarization axis normal to the longitudinal direction of film. Now, one of the polarizing films used here was any of the films of Examples or Comparative Examples after saponified, and the other film used here was Fujitac TD60UL which was saponified.

Note that, for the case where the retardation layer was formed by direct coating on the polarizing plate, followed by ripening, drying and UV irradiation, the step of manufacturing polarizing plate was omitted.

<Manufacture of Liquid Crystal Display Device>

A liquid crystal cell of iPad (registered trademark of Apple Inc.) was used as an IPS-mode liquid crystal cell, after peeling off the polarizing plate on the viewer's side.

In place of the thus-removed polarizing plate, each of the polarizing plates manufactured above was bonded to the liquid crystal cell, to manufacture the individual liquid crystal display devices. In the process of bonding, the absorption axis of the polarizing plate and the optical axis of the liquid crystal layer in the liquid crystal cell were aligned normal to each other, when the liquid crystal cell was observed in the direction normal to the substrate plane.

Each of the thus bonded liquid crystal display device was illuminated to confirm that images were displayed without problems.

TABLE 2

| | Polymer Compound | | | Liquid Crystalline Compound | Alignment controlling Agent (parts by mass) | Dry Film Thickness | UV Irradiation | | Re | Evaluation | |
|---|---|---|---|---|---|---|---|---|---|---|---|
| | Photo-Reactive | Terminal | Number Of Arylene | | | | Illuminance | Dose | | | |
| Species | Species | Group | Group | Groups | Species | Species | μM | mW/cm² | mJ/cm² | (nm) | Contrast | Nz |
| Example B1 | Polymer Compound 1 | Azo | Amino | 4 | None | Alignment controlling Agent 1 (20) | 0.4 | 148 | 1480 | 20 | 320000 | −0.1 |
| Comparative Example B1 | None | — | — | — | Liquid Crystalline Compound 1 | Alignment controlling Agent 2 And 3 (0.34 In Total) | 0.4 | 148 | 1480 | 20 | 4500 | 1.48 |
| Comparative Example B2 | None | — | — | — | Liquid Crystalline Compounds 2, 3 | Alignment controlling Agent 4 (0.35) | 0.4 | 148 | 1480 | 15 | 4800 | 1.0 |
| Example B2 | Polymer Compound 1 | Azo | Amino | 4 | None | Alignment controlling Agent 1 (20) | 1.5 | 148 | 1480 | 70 | 260000 | −0.1 |
| Example B3 | Polymer Compound 1 | Azo | Amino | 4 | None | Alignment controlling Agent 1 (20) | 2.8 | 148 | 1480 | 140 | 240000 | 0 |
| Comparative Example B3 | Polymer Compound 1 | Azo | Amino | 4 | None | None | 0.4 | 148 | 1480 | 50 | 40000 | 0.33 |
| Example B4 | Polymer Compound 1 | Azo | Amino | 4 | None | Alignment controlling Agent 1 (5) | 0.4 | 148 | 1480 | 40 | 280000 | −0.2 |
| Comparative Example B4 | Polymer Compound 1 | Azo | Amino | 4 | None | Alignment controlling Agent 1 (45) | 0.4 | 148 | 1480 | 5 | 540000 | 0 |
| Comparative Example B5 | Polymer Compound 1 | Azo | Amino | 4 | None | Alignment controlling Agent 1 (60) | 0.4 | 148 | 1480 | 2 | 630000 | 0 |
| Example B5 | Polymer Compound 2 | Azo | Amino | 7 | None | Alignment controlling Agent 1 (20) | 1.5 | 148 | 1480 | 140 | 240000 | 0 |
| Comparative Example B6 | Polymer Compound 3 | Azo | Amino | 2 | None | Alignment controlling Agent 1 (20) | 2.8 | 148 | 1480 | 8 | 500000 | 0 |
| Comparative Example B7 | Polymer Compound 4 | Azo | Amino | 14 | None | Alignment controlling Agent 1 (20) | 0.4 | 148 | 1480 | 70 | 3000 | −0.5 |
| Example B6 | Polymer Compound 5 | Azo | Alkyl | 4 | None | Alignment controlling Agent 1 (20) | 1.5 | 148 | 1480 | 145 | 230000 | 0.25 |
| Comparative Example B8 | None | — | — | — | Liquid Crystalline Compounds 2, 3 | Alignment controlling Agent 1 (5) | 0.4 | 148 | 1480 | 12 | 4800 | 1.0 |

Note:
Contents of Polymer Compounds in the retardation film of Examples B1 to B6 are 71% by mass or more.

Summary of Examples

The retardation films of Examples B1 to B7, which satisfy the conditions of this invention and was manufactured using the polymer compounds and the alignment controlling agent were found to achieve remarkably high levels of contrast in the state where in-plane retardation was expressed as compared with the conventional retardation films using liquid crystalline compounds, and also to achieve Nz more closer to zero, which has conventionally been difficult to achieve. The retardation films of Comparative Examples B1, B2 and B8, which do not contain the polymer compound specified by this invention, were found to show only low contrasts, and failed to bring Nz close to zero. The retardation film of Comparative Example B3 containing no alignment controlling agent failed to bring Nz close to zero. The retardation films of Comparative Examples B4 and B5 failed to express the in-plane retardation specified by this invention. Comparative Example B6, having the number of arylene groups in the side chain of the polymer compound out of the range specified by this invention, failed to express e in-plane retardation specified by this invention. The retardation film of Comparative Example B7, having the number of arylene groups in the side chain of the polymer compound out of the range specified by this invention, showed only a low contrast, and failed to bring Nz closer to zero.

The invention claimed is:

1. A retardation film formed from a composition which comprises:
a polymer compound,
wherein the polymer compound is represented by Formula IX or Formula XI:

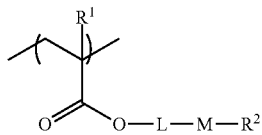

Formula IX in the formula, $R^1$ represents a hydrogen atom or methyl group, L represents a single bond, $-(CH_2)_xO-$ or $-(CH_2CH_2O)_y-$, x is an integer of 2 to 10, y is an integer of 1 to 5, $R^2$ represents an optionally substituted amino group or hydrocarbon group, and M represents a structure represented by Formula X below:

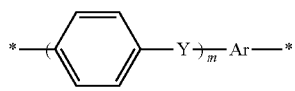

Formula X in the formula, each * represents a bonding site with L or $R^2$; Y represents an azo group, $-OCO-$, $-CO(=O)-$, $-OCO-CH=CH-$ or $-CH=CH-CO_2-$, m represents an integer of 2 to 9, the plurality of (Y)s may be same or different; and Ar represents an optionally substituted arylene group;

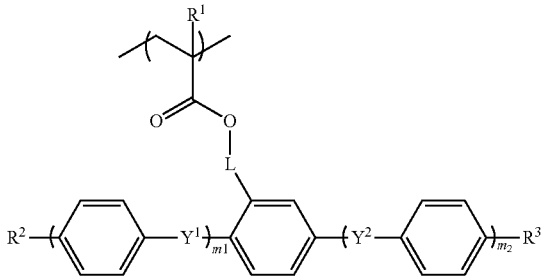

Formula XI in the formula XI, $R^1$ represents a hydrogen atom or methyl group; L represent a single bond, $-(CH_2)_x O-$, x is an integer of 2 to 10, or $-(CH_2CH_2O)_y-$, y is an integer of 1 to 6; each of $R^2$ and $R^3$ independently represents a hydrogen atom, alkyl group having 1 to 10 carbon atoms, alkoxy group having 1 to 9 carbon atoms, or optionally substituted amino group; each of $Y^1$ and $Y^2$ independently represents an azo group, $-OCO-CH=CH-$, or $-CH=CH-CO_2-$; and each of m1 and m2 independently represents an integer of 1 or 2, when m1 or m2 represents 2, the plurality of ($Y^1$)s or ($Y^2$)s may be same or different;
a rod-like liquid crystal compound,
wherein said rod-like liquid crystal compound is composed having a structure represented by Formula (I):

Q1-SP1-X1-M$_1$-(Y1-L-Y2-M$_2$)$n$-X2-SP2-Q2,   Formula (I):

wherein
n is an integer of 0 to 3, which denotes the number of repetition of (Y1-L-Y2-M$_2$),
each of Q1 and Q2 represents a polymerizable group, and each of the polymerizable groups Q1 and Q2 is preferably one of an acryloyl group, methacryloyl group, radical polymerizable group or ring-opened polymerizable group,
each of SP1 and SP2 represents one of a straight-chain or branched alkylene group, or a group composed of a straight-chain or branched alkylene group combined with at least one of $-O-$ and $-C(=O)-$, having a total number of carbon atoms of 2 to 8 in integer;
each of X1 and X2 represents a single bond or oxygen atom;
$-Y1-L-Y2-$ represents one of a straight-chain alkylene group, or a group composed of straight-chain alkylene group and $-O-$ and/or $-C(=O)-$, having a total number of carbon atoms of 3 to 18 in integer; and
each of M$_1$ and M$_2$ configures a mesogenic group, including a group having one of a rod-like or plate-like rigid structure,
M$_1$ is a group represented by one of $-Ar1-COO-Ar2-COO-Ar3-COO-$ or $-Ar1-COO-Ar2-COO-Ar3-$ or $-Ar1-COO-Ar2-Ar3-$;
M$_2$ is a group represented by one of $-Ar3-OCO-Ar2-OCO-Ar1-OCO-$ or $-Ar3-OCO-Ar2-OCO-Ar1-$ or $-Ar3-OCO-Ar2-Ar1-$; and
each of Ar1, Ar2 and Ar3 independently represents phenylene or biphenylene substituted by an arbitrary number of bromine atom(s), methyl group(s), or methoxy group(s), and
a photo-reactive compound, wherein
the polymer compound has a side chain which has one or more azo groups and/or cynnamate groups, and 3 or more and 10 or less arylene groups;
the side chain further has an optionally substituted amino group, or a hydrocarbon group at the terminal;
an absolute value of difference between an SP value of the polymer compound and an SP value of the photo-reactive compound is 1.1 or less; and
an in-plane retardation of the film at wavelength of 550 nm is 10 nm or more and 200 nm or less.

2. The retardation film of claim 1, wherein the polymer compound is represented by Formula IX:

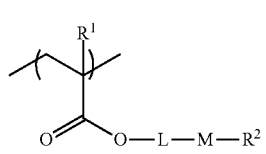

Formula IX in the formula, $R^1$ represents a hydrogen atom or methyl group, L represents a single bond, $-(CH_2)_xO-$ or $-(CH_2CH_2O)_y-$, x is an integer of 2 to 10, y is an integer of 1 to 5, $R^2$ represents an optionally substituted amino group or hydrocarbon group, and M represents a structure represented by Formula X below:

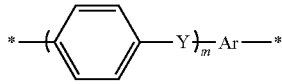

Formula X in the formula, each * represents a bonding site with L or $R^2$; Y represents an azo group, —OCO—, —CO(=O)—, —OCO—CH=CH— or —CH=CH—CO$_2$—, m represents an integer of 2 to 9, the plurality of (Y)s may be same or different; and Ar represents an optionally substituted arylene group.

3. The retardation film of claim 1, wherein a content of the rod-like liquid crystal compound, relative to 100 parts by mass of the polymer compound, is 0.1 to 40 parts by mass.

4. The retardation film of claim 1, wherein a content of the photo-reactive compound, relative to 100 parts by mass of the polymer compound, is 0.1 to 40 parts by mass.

5. The retardation film of claim 1, which is a single layered film.

6. The retardation film of claim 1, which has an Nz of 0.3 to 0.9, where Nz=(nx-nz)/(nx-ny), nx represents refractive index in in-plane slow axis direction, ny represents refractive index in the in-plane direction normal to nx, and nz represents refractive index in the direction normal to nx and ny.

7. The retardation film of claim 1, which has a thickness of 5 μm or less.

8. A composition comprising:
a polymer compound,
wherein the polymer compound is represented by Formula IX or Formula XI:

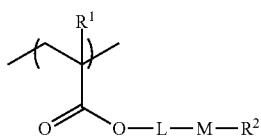

Formula IX in the formula, $R^1$ represents a hydrogen atom or methyl group, L represents a single bond, —(CH$_2$)$_x$O— or —(CH$_2$CH$_2$O)$_y$—, x is an integer of 2 to 10, y is an integer of 1 to 5, $R^2$ represents an optionally substituted amino group or hydrocarbon group, and M represents a structure represented by Formula X below:

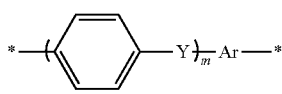

Formula X in the formula, each * represents a bonding site with L or $R^2$; Y represents an azo group, —OCO—, —CO(=O)—, —OCO—CH=CH— or —CH=CH—CO$_2$—, m represents an integer of 2 to 9, the plurality of (Y)s may be same or different; and Ar represents an optionally substituted arylene group;

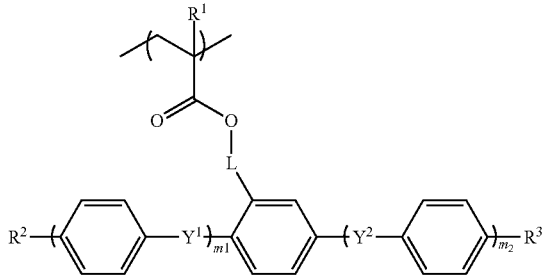

Formula XI in the formula XI, $R^1$ represents a hydrogen atom or methyl group; L represent a single bond, —(CH$_2$)$_x$O—, x is an integer of 2 to 10, or —(CH$_2$CH$_2$O)$_y$—, y is an integer of 1 to 6; each of $R^2$ and $R^3$ independently represents a hydrogen atom, alkyl group having 1 to 10 carbon atoms, alkoxy group having 1 to 9 carbon atoms, or optionally substituted amino group; each of $Y^1$ and $Y^2$ independently represents an azo group, —OCO—CH=CH—, or —CH=CH—CO$_2$—; and each of m1 and m2 independently represents an integer of 1 or 2, when m1 or m2 represents 2, the plurality of ($Y^1$)s or ($Y^2$)s may be same or different;
a rod-like liquid crystal compound and a photo-reactive compound,
wherein said rod-like liquid crystal compound is composed having a structure represented by Formula (I):

Q1-SP1-X1-M$_1$-(Y1-L-Y2-M$_2$)n-X2-SP2-Q2,     Formula (I):

wherein
n is an integer of 0 to 3, which denotes the number of repetition of (Y1-L-Y2-M$_2$),
each of Q1 and Q2 represents a polymerizable group, and each of the polymerizable groups Q1 and Q2 is preferably one of an acryloyl group, methacryloyl group, radical polymerizable group or ring-opened polymerizable group,
each of SP1 and SP2 represents one of a straight-chain or branched alkylene group, or a group composed of a straight-chain or branched alkylene group combined with at least one of —O— and —C(=O)—, having a total number of carbon atoms of 2 to 8 in integer;
each of X1 and X2 represents a single bond or oxygen atom;
—Y1-L-Y2- represents one of a straight-chain alkylene group, or a group composed of straight-chain alkylene group and —O— and/or —C(=O)—, having a total number of carbon atoms of 3 to 18 in integer; and
each of M$_1$ and M$_2$ configures a mesogenic group, including a group having one of a rod-like or plate-like rigid structure,
M$_1$ is a group represented by one of —Ar1-COO—Ar2-COO—Ar3-COO— or —Ar1-COO—Ar2-COO—Ar3- or —Ar1-COO—Ar2-Ar3-;
M$_2$ is a group represented by one of —Ar3-OCO—Ar2-OCO—Ar1-OCO— or —Ar3-OCO—Ar2-OCO—Ar1- or —Ar3-OCO—Ar2-Ar1-, and
each of Ar1, Ar2 and Ar3 independently represents phenylene or biphenylene substituted by an arbitrary number of bromine atom(s), methyl group(s), or methoxy group(s), wherein
the polymer compound has a side chain which has one or more azo groups and/or cynnamate groups, and 3 or more and 10 or less arylene groups;
the side chain further has an optionally substituted amino group, or a hydrocarbon group at the terminal; and
an absolute value of difference between an SP value of the polymer compound and an SP value of the photoreactive compound is 1.1 or less.

9. A method of manufacturing a retardation film of claim 1, which comprises coating the composition of claim 8 on a substrate.

10. The method of manufacturing a retardation film according to claim 9, which further comprises heating the composition, having been coated on the substrate, at 40° C. or above, and photo-irradiating the composition after heating at a dose of 300 to 30000 mJ/cm$^2$.

11. A polarizing plate comprising a polarizer, and the retardation film of claim 1.

12. A liquid crystal display device comprising the retardation film of claim 1.

13. The liquid crystal display device of claim 12, which is an IPS liquid crystal display device.

14. The retardation of claim 1, wherein the rod-like liquid crystal compound has a polymerizable group and the rod-like liquid crystal compound is polymerized by the photoreactive compound.

* * * * *